(12) United States Patent
Hajimiri et al.

(10) Patent No.: US 10,827,324 B1
(45) Date of Patent: Nov. 3, 2020

(54) METHOD AND APPARATUS FOR TRACKING ASSETS

(71) Applicant: Samsara Networks Inc., San Francisco, CA (US)

(72) Inventors: Hadi Hajimiri, Burlingame, CA (US); Rishabh Gupta, Burlingame, CA (US); Ye-Sheng Kuo, Santa Clara, CA (US); Kenneth Lee, San Francisco, CA (US); Siri Amrit Ramos, San Francisco, CA (US); Justin Tingao Xiao, San Francisco, CA (US); Pete Nicholas Chulick, St. Louis, MO (US); Gautam Ravi Ramaswamy, Monmouth Junction, NJ (US)

(73) Assignee: Samsara Networks Inc., San Francisco, CA (US)

( * ) Notice: Subject to any disclaimer, the term of this patent is extended or adjusted under 35 U.S.C. 154(b) by 0 days.

(21) Appl. No.: 16/458,766

(22) Filed: Jul. 1, 2019

(51) Int. Cl.
| | |
|---|---|
| *H04W 4/33* | (2018.01) |
| *H04W 4/029* | (2018.01) |
| *G01S 5/00* | (2006.01) |
| *G06K 7/10* | (2006.01) |
| *G06Q 50/28* | (2012.01) |

(52) U.S. Cl.
CPC ............ *H04W 4/33* (2018.02); *G01S 5/0027* (2013.01); *G06K 7/10366* (2013.01); *H04W 4/029* (2018.02); *G06Q 50/28* (2013.01)

(58) Field of Classification Search
CPC .... H04W 4/33; H04W 4/029; G06K 7/10366; G01S 5/0027; G06Q 50/28
See application file for complete search history.

(56) References Cited

U.S. PATENT DOCUMENTS

| | | | |
|---|---|---|---|
| 5,917,433 A | 6/1999 | Keillor et al. | |
| 8,036,679 B1 * | 10/2011 | Barbeau ............... | H04W 4/029 |
| | | | 455/456.1 |
| 8,633,672 B2 | 1/2014 | Jung et al. | |
| 9,823,342 B2 * | 11/2017 | Cook ................ | G08B 21/0275 |

(Continued)

FOREIGN PATENT DOCUMENTS

WO 2016108420 A1 7/2016

OTHER PUBLICATIONS

Dziuk B., "Solar-Powered GPS Tracking Device XT-4800G," Solar Powered Device, Feb. 16, 2017, 7 pages.

(Continued)

*Primary Examiner* — James J Yang
(74) *Attorney, Agent, or Firm* — Nicholson De Vos Webster & Elliott LLP

(57) ABSTRACT

A tracking device is described. The tracking device receives, from a management server, configuration parameters including a first data transmission rate and a second data transmission rate. The tracking device automatically enters into an active mode of the tracking device. When operating in an active mode, the tracking device, is operative to transmit, in response to determining based on first motion sensor measurements that the asset is stationary, first location data at the first data transmission rate. In response to determining, based on second motion sensor measurements and motion definition parameters, that the asset is mobile, the tracking device is operative to transmit, second location data of the asset at the second data transmission rate.

30 Claims, 14 Drawing Sheets

(56) References Cited

U.S. PATENT DOCUMENTS

| | | | |
|---|---|---|---|
| 2006/0167591 A1 | 7/2006 | McNally | |
| 2009/0322510 A1* | 12/2009 | Berger | G06Q 10/0833 |
| | | | 340/539.1 |
| 2011/0260858 A1* | 10/2011 | Eruchimovitch | G01S 5/02 |
| | | | 340/539.13 |
| 2012/0235625 A1 | 9/2012 | Takehara | |
| 2014/0278108 A1 | 9/2014 | Kerrigan et al. | |
| 2015/0036517 A1* | 2/2015 | Ruutu | H04W 24/10 |
| | | | 370/252 |
| 2017/0263049 A1 | 9/2017 | MacDonald et al. | |
| 2017/0286838 A1 | 10/2017 | Cipriani et al. | |
| 2017/0332199 A1 | 11/2017 | Elliott et al. | |

OTHER PUBLICATIONS

"NextPoint," Titan GPS Elite Reseller, downloaded from https://www.nextpointgps.com, 2017, 8 pages.

"Solar Powered GPS Tracker, know where your assets are at all times," The Industry's most innovative solar powered device for asset and tracking, Wirelesslinks, Piccolo ATX2S, 2017, 8 pages.

"Solar Trax," Solar-Powered Tracking of Valuable Assets, downloaded from https://www.gofleet.com/wp-content/uploads/2016/10/SolarTraxSpecSheet.pdf, 4 pages.

"Solar-Powered Trailer Tracking," The Industry's Most Trusted Trailer Telematics Solution, ORBCOMM, 2 pages.

Solar Trax, Solar Powered Asset Tracking Solution, gofleet, downloaded from https://www.gofleet.com/product/xirgo-asset-tracking, 2 pages.

\* cited by examiner

```
┌─────────────────────────────────────────────────────────────────┐
│ RECEIVE, FROM A MANAGEMENT SERVER, CONFIGURATION PARAMETERS     │
│ INCLUDING FIRST CONFIGURATION PARAMETERS THAT INCLUDES A FIRST  │
│ DATA TRANSMISSION RATE AND SECOND CONFIGURATION PARAMETERS      │
│ THAT INCLUDES A SECOND DATA TRANSMISSION RATE                   │
│                              202                                │
└─────────────────────────────────────────────────────────────────┘
                                 │
                                 ▼
┌─────────────────────────────────────────────────────────────────┐
│ AUTOMATICALLY ENTER INTO AN ACTIVE MODE OF THE TRACKING DEVICE, │
│            WHERE THE ACTIVE MODE INCLUDES                       │
│                         204                                     │
│                                                                 │
│   ┌───────────────────────────────────────────────────────┐     │
│   │        MONITOR THE MOTION SENSOR MEASUREMENTS         │     │
│   │                         205                           │     │
│   └───────────────────────────────────────────────────────┘     │
│                              │                                  │
│                              ▼                                  │
│   ╱───────────────────────────────────────────────────────╲     │
│  ╱ DETERMINE, BASED ON MOTION SENSOR MEASUREMENTS, WHETHER ╲    │
│  ╲              THE ASSET IS STATIONARY                    ╱    │
│   ╲                         206                           ╱     │
│    ───────────┬──────────────────────────────┬───────────       │
│              NO                             YES                 │
│               ▼                              ▼                  │
│   ┌──────────────────────────┐   ┌──────────────────────────┐   │
│   │ TRANSMIT, AT THE SECOND  │   │ TRANSMIT, AT THE FIRST   │   │
│   │ DATA TRANSMISSION RATE,  │   │ DATA TRANSMISSION RATE,  │   │
│   │ SECOND LOCATION DATA OF  │   │ FIRST LOCATION DATA OF   │   │
│   │ THE ASSET TO THE         │   │ THE ASSET TO THE         │   │
│   │ MANAGEMENT SERVER        │   │ MANAGEMENT SERVER        │   │
│   │          210             │   │          208             │   │
│   └──────────────────────────┘   └──────────────────────────┘   │
└─────────────────────────────────────────────────────────────────┘
```

Fig. 2A

TRANSMIT, AT THE SECOND DATA TRANSMISSION RATE, SECOND LOCATION DATA OF THE ASSET TO THE MANAGEMENT SERVER
210

TRANSMIT, TO THE MANAGEMENT SERVER, A FIRST LOCATION READING UPON AUTOMATICALLY DETECTING, BASED ON THE MOTION DEFINITION PARAMETER, THAT THE TRACKING DEVICE HAS STARTED MOVING
218

TRANSMIT, TO THE MANAGEMENT SERVER, ONE OR MORE ADDITIONAL LOCATION READINGS BASED ON THE SECOND DATA TRANSMISSION RATE WHILE THE TRACKING DEVICE IS DETERMINED TO BE MOVING
220

TRANSMIT, TO THE MANAGEMENT SERVER, A SECOND LOCATION READING UPON AUTOMATICALLY DETERMINING, BASED ON THE MOTION DEFINITION PARAMETER, THAT THE TRACKING DEVICE HAS STOPPED MOVING
222

Fig. 2B

METHOD AND APPARATUS FOR TRACKING ASSETS

TECHNICAL FIELD

Embodiments of the invention relate to the field of asset tracking, and more specifically, to a method and apparatus of tracking assets.

BACKGROUND ART

Asset tracking is a field that relates to tracking the location of an asset. Unpowered assets play an important role in the day-to-day operations of a fleet. Trailer dollies, storage containers, dumpsters, heavy machinery equipment, rail cars, generators, and other high-value assets are examples of unpowered assets that a fleet may need to track. However, tracking these unpowered assets is often overlooked at the expense of more expensive and more substantial assets such as trucks or powered equipment. Since lower cost assets aren't typically tracked as closely as trucks or powered equipment, they can be a big target for theft. Further, these unpowered assets can be moved and placed in locations, such as large warehouses or manufacturers, in which it can be time consuming and complex to locate them when needed.

BRIEF DESCRIPTION OF THE DRAWINGS

The invention may best be understood by referring to the following description and accompanying drawings that are used to illustrate embodiments of the invention. In the drawings:

FIG. 2A illustrates a flow diagram of operations performed in a tracking device, in accordance with some embodiments.

FIG. 2B illustrates a flow diagram of exemplary operations performed in a tracking device for transmission of data at a second data transmission rate, in accordance with some embodiments.

DETAILED DESCRIPTION

Figure 1A:
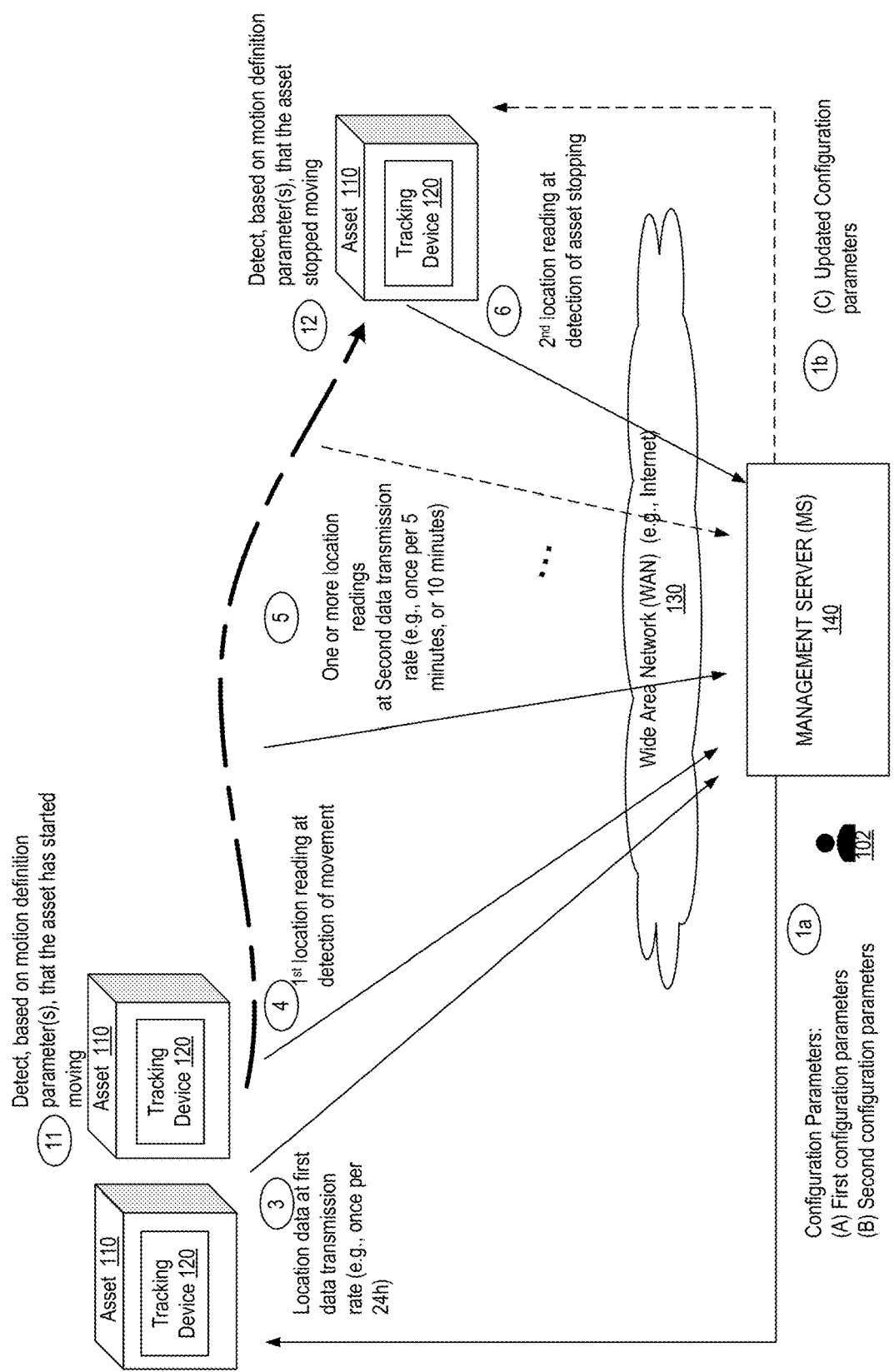
FIG. 1A illustrates a block diagram of exemplary deployment of a tracking device to track the location of an asset, when the tracking device can operate in at least one of two modes of operation, in accordance with some embodiments.

In the following description, numerous specific details are set forth. However, it is understood that embodiments of the invention may be practiced without these specific details. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments presented herein describe an asset tracking device that is to be mounted on an asset. The asset tracking device is operative to transmit location data and optional sensor measurements to a remote management server to enable reliable tracking of the location and state of the asset on which it is mounted. The asset tracking device can operate even if its connection with a management server is unreliable. The asset tracking device operates off a battery, without an external power source, for an extended period of time. The asset tracking device operates efficiently allowing to prolong the battery life. The asset tracking device is also operative to enable tracking of the asset when the asset moves through outdoor or indoor locations. The asset tracking device is operative to maintain reliable communication to the management server through a plurality of communication interfaces, in particular through the use of multiple wireless network communication networks.

A method and a tracking device for tracking an asset are presented. In one embodiment, the tracking device receives, from a management server, configuration parameters including first configuration parameters and second configuration parameters. The first configuration parameters define a first mode of operation of the tracking device and the second configuration parameters define a second mode of operation of the tracking device. The tracking device automatically enters into an active mode of the tracking device. When operating in an active mode, the tracking device, in response to determining, based on first motion sensor measurements recorded by an accelerometer, that the asset is stationary, transmits, based on the first configuration parameters, first location data of the asset to the management server at a first data transmission rate. In response to determining, based on second motion sensor measurements recorded by the accelerometer, that the asset is mobile, the tracking device transmits, based on the second configuration parameters, second location data of the asset to the management server at a second data transmission rate.

In one embodiment, the tracking device receives, from a management server, configuration parameters including the first configuration parameters and the second configuration parameters. The tracking device automatically enters, based on first pressure measurements, into an active mode of the tracking device. When operating in the active mode of operation, the tracking device is operative to transmit based on the first configuration parameters and in response to determining that the asset is stationary, first location data of the asset at a first data transmission rate. In the active mode, the tracking device is further operative to transmit, based on the second configuration parameters and in response to determining, that the asset is mobile, second location data of the asset at a second data transmission rate. In some embodiments, the second data transmission rate is higher than the first data transmission rate causing the management server to obtain more frequent location data when the asset is mobile than when the asset is stationary. The tracking device is operative to automatically enter, based on second pressure measurements recorded by the pressure sensor, into a passive mode in which no data is transmitted.

FIGS. 1A-E illustrate block diagrams of exemplary deployments of an asset tracking system that can be used for tracking the location of an asset, in accordance with some embodiments. The system 100 includes a management server 140, a tracking device 120 that is mounted on an asset 110, and a wide area network (WAN) 130.

The asset is a physical element of which movement is to be tracked. The asset is typically moved or can move from one location to other location(s) over time. The asset can be part of a fleet of assets tracked by a fleet management system. The fleet management system may include a set of tracking devices, such as tracking device 120, and the management server 140. The asset is located remotely from the management server 140 and may change location over a period of time. The asset can be a trailer to be coupled with a tractor, a semi-trailer, a heavy equipment/machinery, a rail car, a generator, an intermodal container, a rental car, a bin, a dumpster, a construction equipment, a portable toilet, or any other physical component on which the tracking device can be mounted. The asset tracking system can be used to track the location of the asset that is expected to travel (move on its own or be moved), may travel indoors and/or outdoors, which may not be able to provide power to the attached tracking device, may not always be in range of a reliable connection for communication, and may be deployed for an extended period of time (e.g., from few days to few months, years). For example, the asset can be a trailer that is parked in a large warehouse for an extended period of time, such as several months or even years.

The tracking device 120 is an electronic device that is to be mounted on an asset and enables the tracking of the location of the asset. In some embodiments, the tracking device 120 can be securely fastened to the asset with anti-theft screws. In some embodiments, the tracking device 120 can be weatherproof and water-resistant. The tracking device 120 is operative to be coupled with the management server 140 through a Wide Area Network (WAN) 130. The connection to the WAN 130 can be through a wireless communication network (e.g., Wi-Fi, cellular connection, etc.). In some embodiments, the tracking device 120 and the management server 140 may be subject to an intermittent connectivity with the WAN. The tracking device 120 is operative to record or obtain data related to the asset on which it is mounted and transmit the data to the management server 140. The tracking device 120 is operative to transmit data indicative of a state of the vehicle. For example, the tracking device 120 may transmit location data indicating the location of the asset on which it is mounted. In some embodiments, the data further includes additional sensor measurements for the asset (such as temperature, humidity, pressure measurements, acceleration measurements, etc.).

In some embodiments, the tracking device 120 is to transmit and receive data through a connectionless communication protocol. In this embodiment, one or more messages of serialized structured data are transmitted from and received by the tracking device 120. The messages may include a message with the configuration parameters. In some embodiments, the serialization of the data to be transmitted to and from the tracking device is performed based on a language-neutral, platform-neutral, extensible mechanism that minimizes data reporting/transmission overhead. The use of the connectionless communication protocol causes the tracking device 120 to transmit and receive reduced size data to/from the management server 140 and making efficient use of the bandwidth between the tracking device and the management server 140. These characteristics of the communication protocol, including the serialization of the structured data allows to further extend the life of the battery of the tracking device 120. In a non-limiting example, the data may be serialized based on Google's Protocol buffers.

In some embodiments, the tracking device 120 is to transmit location data indicating location of the asset 110. The location data may include one or more location readings and is transmitted to the management server 140. The transmission of the location data can be performed based on one or more embodiments as described herein depending on a mode of operation of the tracking device 120. The management server 140 receives, from the tracking device 120, the location data including one or more location readings indicating the location of the tracking device at respective times. A location reading is determined through a positioning technology. In one embodiment, the location reading is a sensor measurement recorded by a location sensor. For example, the location sensor can be a Global Positioning System (GPS) sensor and the location reading includes GPS coordinates. The location reading indicates a location of the tracking device at a given time. In some embodiments, the location reading is determined through a different positioning system such as a local positioning system. The location reading indicates a location of the asset 110 on which the tracking device 120 is mounted. In some embodiments, the tracking device 120 transmits several location readings that correspond to the location of the mobile asset on which the tracking device 120 is mounted at one or more times. For example, the tracking device 120 may transmit 10 location readings recorded in the last 5 minutes. The location readings indicate current location of the tracking device 120. In some embodiments, each location reading can include coordinates in a coordinate system (e.g., longitude, latitude, or other) and an associated time (e.g., a timestamp). The time can indicate the time at which the latitude and longitude were recorded by the location sensor; alternatively, the timestamp can indicate the time at which the latitude, longitude are transmitted from the tracking device 120.

Figure 3A:
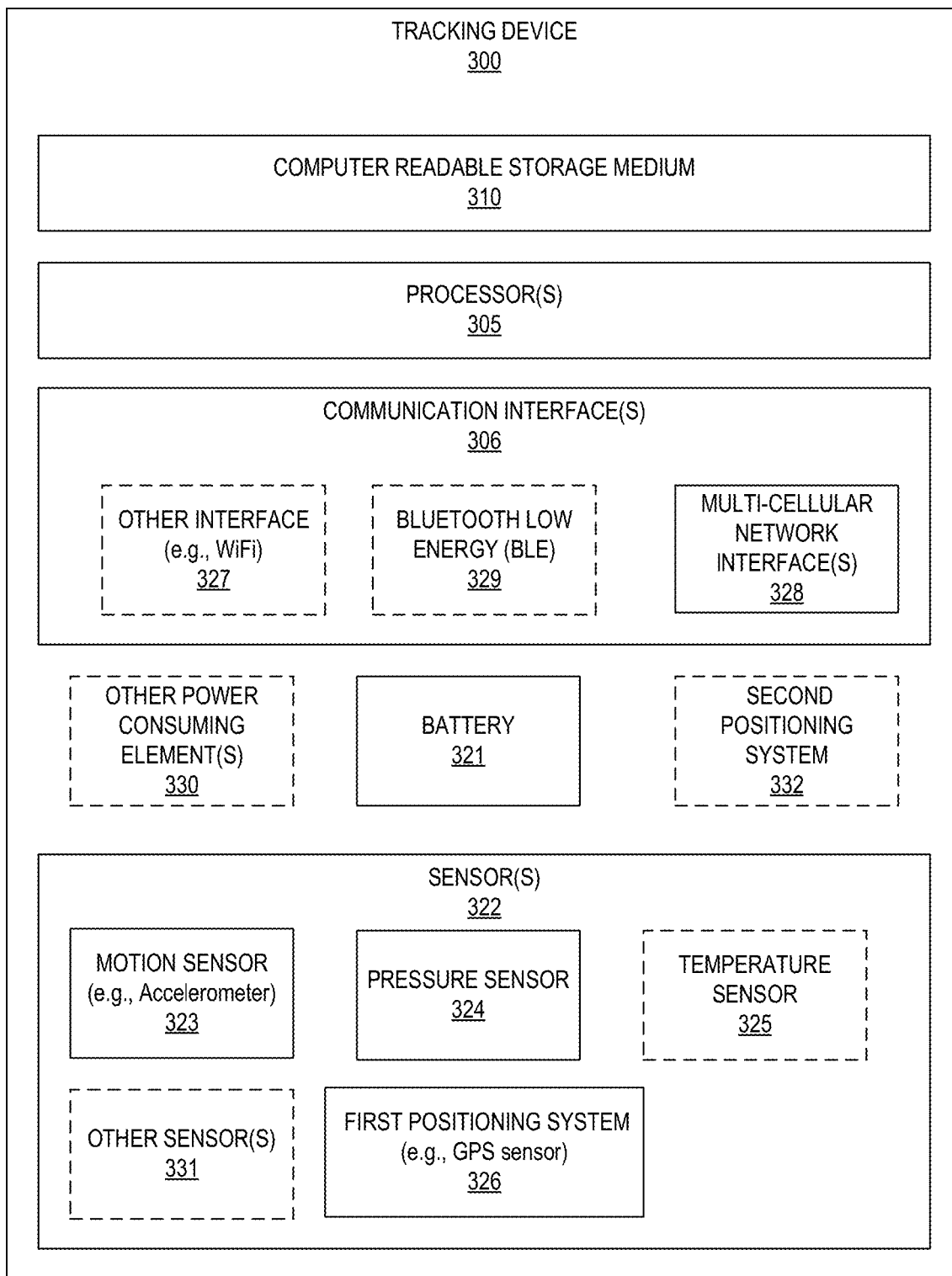
FIG. 3A illustrates a block diagram of an exemplary tracking device that can be used in some embodiments.

In some embodiments, the tracking device 120 is implemented as described in further details with reference to FIG. 3A. The tracking device 120 includes a battery 321. The tracking device 120 is to operate efficiently off of the battery 321 without an external power source, for an extended period of time (e.g., from few months to few years). As it will be described in further details below, the tracking device 120 operates efficiently, transmitting data as needed, while avoiding unnecessary power expenditures and ensuring prolongation of battery life.

In some embodiments, the tracking device 120 may be coupled with one or more wireless sensing devices (not illustrated). The wireless sensing devices (WSDs) are electronic devices that include one or more sensors for detecting physical events (e.g., temperature, humidity, barometric pressure, CO2 concentration, acceleration, pressure, sound, movement, etc.) and recording sensor measurements in response to the detection of these physical events. The wireless sensing devices can be small electronic devices that are attachable to an object for recording sensor information related to physical events related to the object (e.g., recording changes in temperature, movement of an object (e.g., a door being closed/opened), sudden accelerations of a vehicle, etc.). The WSDs can then store the sensor measurements related to physical events detected over a period of time. The WSDs may record sensor measurements at regular intervals of time (e.g., the WSDs may detect the temperature of a room, or an object (e.g., refrigerator, food product), and record corresponding temperature measurements every N seconds or minutes). The sensor measurements are stored in a non-transitory computer readable medium of the WSDs. Each of the WSDs is operative to be coupled to a device acting as a gateway system (e.g., tracking device 120) and to establish a communication channel to transfer the recorded sensor measurements. In some embodiments, each of the WSDs can connect to the tracking device through a wireless communication interface (e.g., Bluetooth Low Energy (BLE), Wi-Fi) or a wired communication interface (e.g., a bus). The WSDs can be internal or external to the tracking device. When a WSD is external to the tracking device 120, the WSD is operative to detect the tracking device and transmit data to the tracking device. In some embodiments, one or more of the WSDs can be included in the tracking device 120. In other embodiments, one or more of the WSDs can be located outside of the tracking device 120. In some embodiments, some WSDs can be included within the tracking device 120 and other WSDs can be located outside of the tracking device 120.

The management server 140 is a cloud-based server operative to receive data from one or more tracking devices (e.g., the tracking device 120) and gateway systems. For example, the management server 140 may receive location data from the tracking device 120 indicating the location of the asset 110. The data received from the tracking devices can be used by the management server 140 to determine and display to a user the location of the asset in real time. In some embodiments, the management server 140 is further operative to receive additional data related to the state of the asset, such as temperature measurements, pressure measurements, and/or other sensor measurements recorded by the tracking device or a wireless sensing device that may be coupled with the tracking device. In some embodiments, the management server 140 is implemented as described in further details with reference to FIG. 3B.

The data received from the tracking device 120 is stored in a sensor measurement database. The sensor measurements (including the location data) may be transmitted to a device of the end user 102 upon receipt of a request for the measurements. The device of the end user 102 is a computing device (e.g., laptop, workstation, smartphone, palm top, mobile phone, tablet, etc.) that is capable of accessing network resources (e.g., it includes software such as web browsers or web applications that are capable of accessing network resources). The user 102 may request access to sensor measurements received from the tracking device. The user 102 can be the owner of the tracking device 120 and the asset 110, while in other embodiments, the user is an administrator of the device.

Tracking Device Operating Based on Movement of the Tracked Asset:

In one embodiment, the tracking device is operative to transmit location data according to a first and a second mode of operation, based on whether or not the asset is mobile or stationary. In some embodiments, the tracking device is further operative to transmit one or more sensor measurements in addition to the location data.

FIG. 1A illustrates a block diagram of exemplary deployment of a tracking device to track the location of the asset, when the tracking device can operate in at least one of two modes of operations, in accordance with some embodiments.

In one embodiment, the tracking device 120 receives, at operation 1a, configuration parameters including first configuration parameters and second configuration parameters. The configuration parameters are received as a result of the user 102 selecting a set of parameters for operation of the tracking device 120. The selection of the configuration parameters can be performed through a user interface displayed on a device of the end user 102. The user interface is caused to be displayed by the management server 140 and allows the user 102 to enter the configuration parameters for configuring one or more tracking devices such as the tracking device 120. The configuration parameters can be received during an initialization phase of the tracking device 120 prior to deployment of the tracking device 120 in the field (e.g., when the tracking device 120 is already mounted on the asset 110 or not yet). In other embodiments, the configuration parameters can be received while the tracking device is already deployed and has been used in the field for a period of time. In these embodiments, the tracking device 120 may be mounted on the asset 110.

The first configuration parameters define a first mode of operation of the tracking device 120 and the second configuration parameters define a second mode of operation of the tracking device 120. The tracking device 120 is to use the first mode of operation when it is stationary. The tracking device 120 is to use the second mode of operation when it is mobile. In some embodiments, the first and the second configuration parameters can be received in a single message from the management server 140. In other embodiments, the first and the second configuration parameters can be received in a first and a second message respectively.

In some embodiments, the first configuration parameters include a first data transmission rate. In some embodiments, the data transmission rate can indicate a frequency (e.g., once a day, once a week, etc.) at which the location data is to be transmitted from the tracking device. In some embodiments, the data transmission rate can indicate one or more times of the day (e.g., 8 AM, 12 PM, etc.) at which location data is to be transmitted from the tracking device. In some embodiments, the first configuration parameters further include a first start time at which the tracking device is to start transmission of location data according to the first data transmission rate. The first configuration parameters are to be used when the asset is stationary and cause the battery life of the tracking device to be extended. For example, the first data transmission rate indicates that location data is to be transmitted from the tracking device 120 once per day, once every other day, or at any other frequency desired by the user 102 for tracking the location of the asset. The first start time may indicate a date and a time of day at which the tracking device is to transmit the location data based on the first frequency. The first configuration parameters may further include an identification of a set of one or more additional sensor measurements that are to be transmitted from the tracking device in addition to the location data. For example, the first configuration parameters may indicate that one of temperature measurements, pressure measures, or any other types of sensor measurements, or a combination of two or more of these measurements are to be transmitted from the tracking device 120 in addition to the location data. In some embodiments, the first configuration parameter may indicate a different data transmission rate for transmitting the additional sensor measurements such that the sensor measurements are transmitted at a data transmission rate that is different from the first data transmission rate. In these embodiments, the first configuration parameters may also indicate a start time for transmitting the additional sensor measurements that is different from the first start time. In other embodiments, the sensor measurements are transmitted at the same data transmission rate as the location data and at the same first start time.

In some embodiments, the second configuration parameters include a second data transmission rate. In some embodiments, the data transmission rate can indicate a frequency at which the location data is to be transmitted from the tracking device. In some embodiments, the data transmission rate can indicate one or more times of the day (e.g., 8 AM, 12 PM, etc.) at which location data is to be transmitted from the tracking device. In some embodiments, the second configuration parameters may include motion definition parameters that are to be used for determining whether the tracking device is mobile or stationary. While the motion definition parameters are described as being received as part of the second configuration parameters, in some embodiments, the motion definition parameters can be received as part of the first configuration parameters instead. In another embodiment, the motion definition parameters can be pre-configured in the tracking device 120 prior to the receipt of the configuration parameters.

In some embodiments, the motion definition parameters define one or more criteria that need to be satisfied for the asset to be considered as being in motion. In some embodiments, the motion definition parameters can be determined based at least in part on sensor measurements. The motion definition parameters can be defined based on the application and type of deployment of the tracking device 120. The motion definition parameters can further vary depending on the type of asset 110 and the type of movement the asset 110 may have. The motion definition parameters can be determined by the user 102 based on observation of a test tracking device. The test tracking device can be the device 120, alternatively, the test tracking device can be another tracking device similar to the tracking device 120. In some embodiments, a user interface is caused to be displayed on the user device of the user 102 by the management server 140, to enable the user 102 to configure and determine the motion definition parameters for a given asset on which a tracking device is mounted.

In some embodiments, the motion definition parameters may include a minimum amount of time during which the tracking device moves for the asset to be considered as being in motion. For example, the user may select that the asset needs to be moving for at least n seconds (e.g., 10 seconds, 30 seconds . . . ), n minutes (e.g., 2 minutes, 5 minutes, etc.), or other, in order for the asset to be considered as being in motion. In some embodiments, the motion definition parameter may include a minimum distance that needs to be traversed by the asset prior to it being considered to be in motion. In other embodiments, the motion definition parameter may include a minimum speed and/or acceleration in one or more directions that the speed or acceleration of the asset need to exceed for the asset to be considered as being in motion. In some embodiments, the user 102 may select a motion pattern as a motion definition parameter for determining that the asset is in motion. For example, the motion definition parameters may include characteristics that define the motion pattern (e.g., the asset moving in a given direction for a first interval of time, the asset moving in another direction for a second interval of time, or any other motion pattern). In some example, while the asset may be located at the same physical location, it may be subject to other types of movement (e.g., vibration of the asset, vertical movement, etc.) that a user may want to detect. In these embodiments, the motion definition parameter may include one or more parameters for defining these movements and patterns (such as direction of movement, speed, acceleration, distance, time elapsed, etc.). While some examples of motion definition parameters are provided, other examples can be contemplated without departing from the scope of the present embodiments. The motion definition parameter enables a user to better define which types of movement of the asset is to be considered as being in motion and can be used to cause the tracking device to enter or exit a motion-based mode of operation.

The second configuration parameters are to be used when the asset is mobile. In some embodiments, the second data transmission rate is greater than the first data transmission rate. For example, the second data transmission rate indicates that location data is to be transmitted from the tracking device 120 once every five minutes, once every ten minutes, or at any other data transmission rate desired by the user 102 for tracking the location of the asset when the asset is moving. The second data transmission rate causes the tracking device 120 to transmit more frequent location data when the asset is in motion consequently enabling a real time tracking of the asset.

In some embodiments, the second configuration parameters can include an optional second start time. The second start time may indicate a date and a time of day at which the tracking device is to operate based on the second configuration parameters if it determines that the tracking device is mobile. In other embodiments, the second configuration parameters do not include the second start time. The second configuration parameters may further include an identification of a set of one or more additional sensor measurements that are to be transmitted from the tracking device in addition to the location data. For example, the second configuration parameters may indicate that one of temperature measurements, pressure measures, or any other types of sensor measurements, or a combination of two or more of these measurements are to be transmitted from the tracking device 120 in addition to the location data. In some embodiments, the second configuration parameter may indicate one or more additional frequencies for transmitting the additional sensor measurements such that the sensor measurements of a given type are transmitted at a data transmission rate that is different from the second data transmission rate. In some embodiments, the second configuration parameters may indicate that no other sensor measurements other than the location data are to be transmitted by the tracking device 120, causing the tracking device 120 to efficiently operate by reducing the amount of data transmitted when the asset is in motion.

Upon receipt of the configuration parameters, the tracking device operates in a first mode based on the first configuration parameters when the asset is stationary and operates in a second mode based on the second configuration parameters when the asset is mobile. The tracking device 120 monitors the motion sensor measurements and determines based on the motion sensor measurements and the motion definition parameters whether the asset is moving or not. The sensor measurements can be recorded by a motion sensor located within the tracking device 120. In some embodiments, the motion sensor measurements can be a combination of sensor measurements detected with a first motion sensor located within the tracking device 120 and another sensor located outside of the tracking device 120. In other embodiments, the motion sensor measurements are recorded by a sensor that is located outside of the tracking device. Upon determining that the motion sensor measurements satisfy the criteria defined by the motion definition parameters, the tracking device 120 determines that the asset is in motion. Alternatively, upon determining that the motion sensor measurements do not satisfy the criteria defined in the motion definition parameters, the tracking device 120 determines that the asset is stationary. In some embodiments, the motion sensor can be an accelerometer.

At operation 3, in response to determining, based on first motion sensor measurements, that the asset is stationary, the tracking device 120 transmits, based on the first configuration parameters, first location data of the asset at the first data transmission rate. At operation 11, the tracking device 120 determines, based on the motion definition parameter(s), that the asset 110 has started moving. In some embodiments, determining that the asset 110 has started moving includes determining that the motion sensor measurement(s) satisfy the criteria defined in the motion definition parameter(s). In response to determining, based on second motion sensor measurements, that the asset is mobile (i.e., has started moving), the tracking device transmits, based on the second data transmission rate, second location data of the asset to the management server.

In some embodiments, transmitting location data based on a second data transmission rate may include: transmitting, at operation 4, a first location reading upon automatically detecting, based on the motion definition parameters, that the tracking device has started moving; transmitting, at operation 5, one or more additional location readings based on the second data transmission rate while the tracking device is determined to be moving; and transmitting to the management server, at operation 6, a second location reading upon automatically determining, based on the motion definition parameters, that the tracking device has stopped moving. The first location reading indicates the location at which the asset has started moving. The second location reading indicates the location at which the asset has stopped. The first and the second location readings are automatically identified by the tracking device 120, based on the first motion definition parameters.

In some embodiments, the tracking device 120 can be configured based on first motion definition parameters during a first time interval and based on a second motion definition parameters during a second time interval. In this embodiment, the definition of being in motion for an asset can vary from a first period of time to a second period of time. In some embodiments, the tracking device 120 may be configured to determine whether the asset is moving or not based on the first motion definition parameters and may receive new motion definition parameters, e.g., included in the updated configuration parameters received at operation 1b, such that detection of a movement of the asset can be performed based on the new set of motion definition parameters. This can be used to detect a type of movement of the asset during a second interval of time that is different from the type of movement of the asset detected during the first interval of time. For example, in the first interval of time, the asset is expected to remain stationary at a location, and any movement of the asset can be determined to be fraudulent and may need to be detected. During this first interval of time, the tracking device 120 is configured based on the first motion definition parameter that enable the detection of any movement of the asset 110. In a second period of time, the asset is expected to be moved within a given set of parameters but not according to another set of parameters (e.g., the asset can be moved inside a warehouse with a trolley but not outside in a vehicle). These different types of movements (e.g., inside warehouse vs. being transported in a vehicle) can be defined based on different motion definition parameters. In particular, the second motion definition parameter can be used to define a second type of movement of the asset (e.g., the asset is being transported on a vehicle). The tracking device 120 is configured to operate in the second mode of operation (i.e., to transmit data according to the second data transmission rate) only when the second motion definition parameters are detected (i.e., when the sensor measurements are determined to satisfy the criteria defined in the second motion definition parameters (e.g., where these parameters define that the asset is being transported on a vehicle outside a warehouse)). In this exemplary embodiment, when the asset moves but the tracking device 120 determines that the motion sensor measurements do not satisfy the criteria of the second motion definition parameters (e.g., the motion sensor measurements do not satisfy the criteria defined in the second motion definition parameters), the tracking device 120 continues to operate in the first mode of operation (stationary mode of operation), by transmitting data according to the first data transmission rate. The tracking device 120 operates in the second mode of operation (motion-based mode of operation), by transmitting data at the second data transmission rate, only upon determination that the criteria of the second motion definition parameters are satisfied (i.e., the motion sensor measurements satisfy the criteria defined in the motion definition parameters).

The embodiments discussed above present a mechanism for operation of a tracking device that is based on whether or not the asset on which the tracking device is mounted is moving. Further, the mode of operations presented herein depend on the type of asset and the type of movement that the asset can have as the determination of whether an asset is moving is performed based on motion definition parameters that are configurable. In the described embodiments, when an asset is not moving, the tracking device transmits less frequent data to the management server, for example, once a day. In contrast, when the asset moves, even unexpectedly, the tracking device is configured to automatically switch from the stationary mode of operation to the mobile mode of operation, such that the data is transmitted more frequently (e.g., every 5 minutes). Using this mechanism, the potential recovery time of a stolen asset is enabled in real-time, while still allowing for the life of the battery of the tracking device to be extended by an efficient use of the transmission link of the tracking device when the tracking device is stationary.

Tracking Device Operating Based on Pressure Measurements of the Tracked Asset

In one embodiment, the tracking device is operative to transmit location data according to a passive and an active mode of operation. In some embodiments, tracking device 120 and the management server 140 are operative to perform operations similar to the operations described with reference to FIG. 1A (operations 1a, 1b, 11, 23, and 3 to 6). In other embodiments, tracking device 120 and the management server 140 are operative to perform only some of the operations described with reference to FIG. 1A (e.g., operations 1a and 3) and perform additional operations which may or may not be performed in the system of FIG. 1A. As will be described in further detail below, in some embodiments, the operations performed to track the location of the asset 110, based on whether the asset is in motion or not, can be performed independently of the operations performed to track the asset 110, based on the passive or active mode that will be described below. In other embodiments, the operations performed to track the asset based on the active or passive mode can be performed along with the operations performed for tracking the asset based on whether the asset is in motion or not.

Figure 1B:
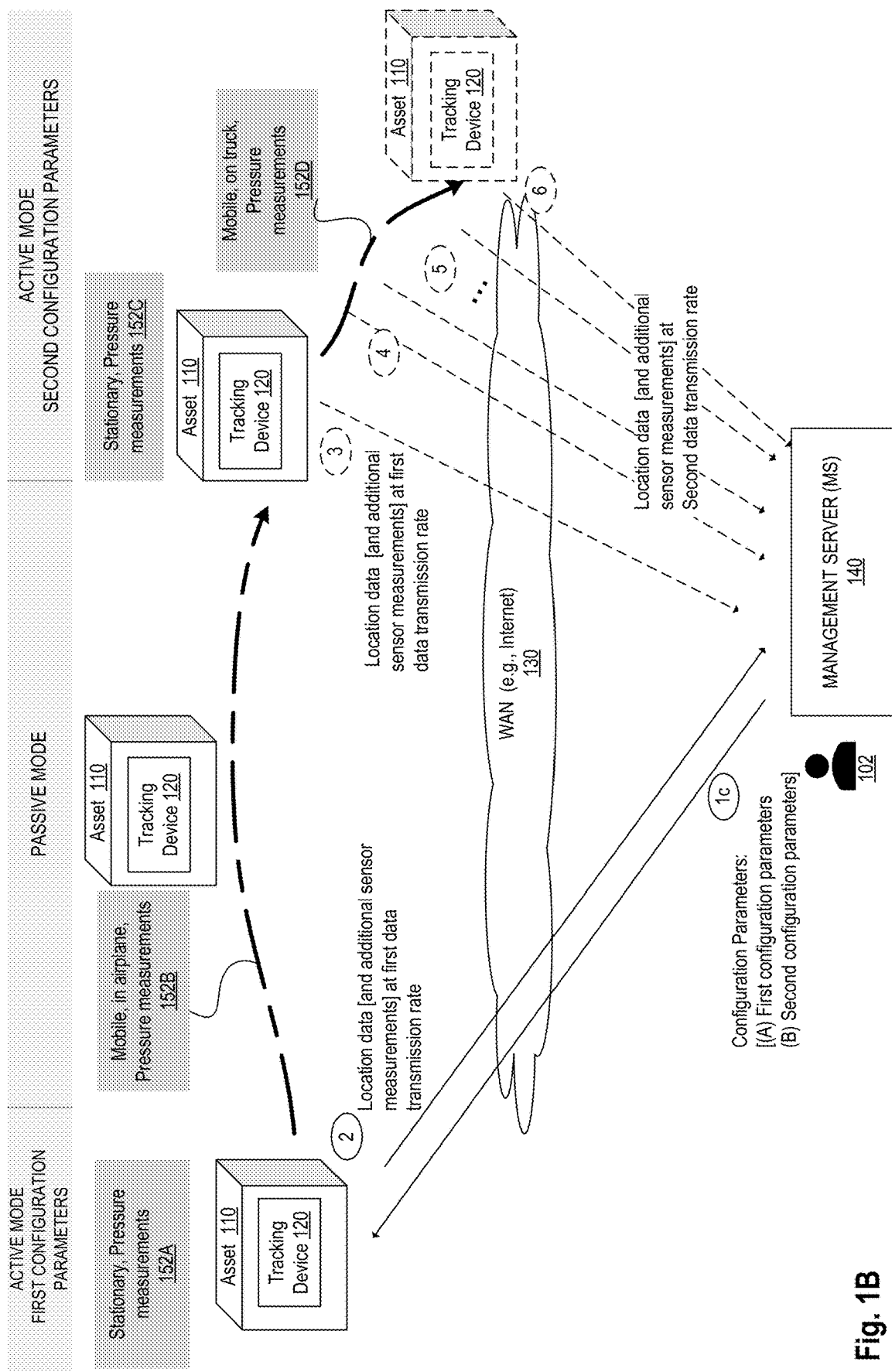
FIG. 1B illustrates a block diagram of exemplary deployment of the tracking device for tracking location of an asset according to a passive or an active mode of operation, in accordance with some embodiments.

FIG. 1B illustrates a block diagram of exemplary deployment of the tracking device for tracking location of an asset according to a passive or an active mode of operation, in accordance with some embodiments.

At operation 1c, the tracking device receives configuration parameters. The configuration parameters are received from the management server 140. The configuration parameters are received as a result of the user 102 selecting a set of parameters for operation of the tracking device 120. The selection of the configuration parameters can be performed through a user interface displayed on a device of the end user 102. The user interface is caused to be displayed by the management server 140 and allows the user 102 to enter the configuration parameters for configuring one or more tracking devices such as the tracking device 120. The configuration parameters can be received during an initialization phase of the tracking device 120 prior to deployment of the tracking device 120 in the field (e.g., when the tracking device 120 is already mounted on the asset 110 or not yet). In other embodiments, the configuration parameters can be received while the tracking device is already deployed and has been used in the field for a period of time. In these embodiments, the asset may be mounted on the asset 110.

In some embodiments, the configuration parameters may include pressure measurement thresholds. In some embodiments, the pressure measurement thresholds can be input by the user 102. In other embodiments, the sensor measurement thresholds can be automatically determined by the management server 140. The management server 140 may receive an indication from the user that the tracking device is to be configured for operation based on passive/active modes and in response to receiving this indication, the management server 140 determines a set of one or more pressure measurement thresholds.

In some embodiments, the configuration parameters may further include first and second configuration parameters. As described with reference to FIG. 1A, the first configuration parameters define a first mode of operation of the tracking device 120 and the second configuration parameters define a second mode of operation of the tracking device 120. The tracking device 120 is to use the first mode of operation when the asset is determined to be stationary. The tracking device 120 is to use the second mode of operation when the asset is determined to be mobile. In some embodiments, the first and the second configuration parameters can be received in a single message from the management server 140. In other embodiments, the first and the second configuration parameters can be received in a first and a second message respectively. In some embodiments, the first and second configuration parameters are to be used for transmission of data from the tracking device 120 when the tracking device is operating in the active mode. In other embodiments, the configuration parameters include a single set of configuration parameters that define a single data transmission rate that the tracking device is to use when operating in the active mode.

The tracking device automatically monitors the pressure measurements recorded by a pressure sensor to determine the pressure of the asset. For example, a pressure sensor may repeatedly record pressure measurements at a given interval of time (e.g., every n ms, n seconds, or n minutes, etc.). In some embodiments, the pressure sensor may be located within the tracking device 120, while in other embodiments, the pressure sensor may be located outside the tracking device 120 and coupled with the tracking device 120 through a short-range communication link. The pressure sensor is to record pressure measurements indicating the pressure to which the asset is submitted (e.g., air pressure).

The tracking device 120 automatically enters, based on pressure measurements, into an active mode of operation. In some embodiments, the tracking device 120 may determine to enter the active mode upon determination that no change in the pressure measurements is detected when compared with previously recorded pressure measurements. Additionally or alternatively, the tracking device 120 may determine to enter the active mode upon determination that the measured pressure measurements are lower than the pressure measurement thresholds received in the configuration parameters. When operating in the active mode of operation, the tracking device 120 is operative to transmit, at operation 2, location data of the asset. The tracking device 120 can further transmit additional sensor measurements. In some embodiments, the transmission of the data (location and/or other data) from the tracking device 120 can be performed according to the first configuration parameters including the first data transmission rate.

The tracking device 120 continues to monitor the pressure measurements and determines based on new pressure measurements that a change occurred in the pressure to which the asset 110 is subjected to. For example, the asset 110 may be placed on an airplane or another type of vehicle that causes the new environment in which the asset 110 is placed to subject the asset and the pressure sensor of the asset to record new sensor measurements, such as 152B, that differ from previously recorded pressure measurements, such as 152A. As a result, the tracking device 120 automatically detects the change in the pressure measurements and automatically enters the passive mode based on this change. Alternatively, or additionally, in some embodiments, the tracking device 120 may automatically enter the passive mode of operation upon determining that the newly recorded pressure measurements are greater than the pressure measurements thresholds.

When operating in a passive mode of operation no data is transmitted from or received by the tracking device 120. For example, the tracking device 120 may disable any interfaces used for communication with the management server (e.g., cellular communication interfaces) causing the tracking device to no longer transmit or receive data to/from the management server 140. In some embodiments, the tracking device 120 may continue to transmit/receive data through short range communication interfaces (such as Wi-Fi, or Blue Tooth Low Energy (BLE)). In other embodiments, all communication is disabled, and no data is transmitted to/from the tracking device 120. In some embodiments, when operating in the passive mode, the tracking device 120 may continue to monitor the pressure measurements. The tracking device 120 may further record zero or more other sensor measurements (e.g., temperature measurement, etc.). In some embodiments, when operating in the passive mode, the tracking device 120 may no longer determine the location of the asset. For example, when the location of the asset is determined based on a first positioning technology, such as Global Positioning Technology (GPS), the tracking device 120 pauses the acquisition of GPS coordinates when it enters the passive mode of operation.

The tracking device 120 remains in the passive mode of operation until a change in the pressure measurements occurs. For example, when the asset 110 is moved from the airplane to a warehouse, the tracking device 120 automatically determines that the pressure measurements 152C have changed when compared with the pressure measurements 152B and automatically re-enters the active mode. When operating in the active mode, transmission of data to/from the tracking device 120 is resumed. In some embodiments, the transmission of data can be performed based on a first data transmission rate. In other embodiments, when operating in the active mode, the transmission of data can be performed based on a first or a second data transmission rate (i.e., based on a first or second mode of operation) depending on whether the asset is mobile or not as described with reference to FIG. 1A (operations 3 to 6). In some embodiments, the tracking device 120 may initiate operation in a first mode of operation and may receive configuration parameters (e.g., operation 1a) that define a first and a second mode of operation. Following the receipt of the configuration parameters, the tracking device 120 operates based on the first or the second mode of operation depending on whether or not the asset is moving. In some embodiments, the second data transmission rate is greater than the first data transmission rate causing the management server 140 to obtain more frequent location data when the asset is mobile than when the asset is stationary.

The embodiments described herein allow the tracking device to track the location of the asset on which it is mounted based on pressure measurements to which the asset is subjected to. These mechanisms allow the tracking device to comply with rules and regulations that may be set for transportation of the asset. For example, when the asset is transported on an airplane, the tracking device automatically stops transmission and receipt of data to comply with aviation and safety regulations without requiring a manual intervention of a user for shutting down or turning the tracking device. Further the tracking device automatically turns transmission of data back on upon determination that a change in the pressure measurements has occurred and that the asset is no longer on an airplane. While the embodiments herein are described with reference to an asset being placed on an airplane, this is intended to be illustrative only to present changes that may occur in the pressure measurements of an asset. This example should not be regarded as limiting and other examples can be contemplated without departing from the scope of the inventive concept presented herein. Other location and/or environment can cause the sensor measurements to change and the tracking device to automatically enter the passive or the active mode of operations based on the pressure measurements.

While the embodiments discussed herein are discussed with respect to pressure measurements that are monitored in order to enable the tracking device to enter an active mode or a passive mode, a similar mechanism can be performed based on temperature measurements.

In these embodiments, the tracking device 120 automatically enters, based on temperature measurements, into an active mode of operation. In some embodiments, the tracking device 120 may determine to enter the active mode upon determination that no change in the temperature measurements is detected when compared with previously recorded temperature measurements. Additionally or alternatively, the tracking device 120 may determine to enter the active mode upon determination that the measured temperature measurements are lower (or higher) than temperature measurement thresholds received in configuration parameters. When operating in the active mode of operation, the tracking device 120 is operative to transmit location data of the asset. The tracking device 120 can further transmit additional sensor measurements. In some embodiments, the transmission of the data (location and/or other data) from the tracking device 120 can be performed according to the first configuration parameters including the first data transmission rate. Alternatively, the transmission of the data from the tracking device 120 can be performed according to the second configuration parameters including the second data transmission rate.

The tracking device 120 continues to monitor the temperature measurements and determines based on new temperature measurements that a change occurred in the temperature to which the asset 110 is subjected to. As a result, the tracking device 120 automatically detects the change in the temperature measurements and automatically enters the passive mode based on this change. Alternatively, or additionally, in some embodiments, the tracking device 120 may automatically enter the passive mode of operation upon determining that the newly recorded temperature measurements are greater than (or lower than) temperature measurements thresholds.

As discussed above, the embodiments of FIG. 1B can be performed in combination with or independently of the embodiments described with reference to FIG. 1A. For example, when operating in an active mode, the tracking device can transmit data according to a single data transmission rate and configuration parameters, alternatively, the tracking device can transmit data according to at least two different frequencies depending on whether or not the asset is moving.

Asset Location Determination Based on First and Second Positioning Technology:

In one embodiment, the tracking device is operative to transmit location data according to a passive and an active mode of operation. In some embodiments, tracking device 120 and the management server 140 are operative to perform operations similar to the operations described with reference to FIG. 1A and FIG. 1B. In other embodiments, tracking device 120 and the management server 140 are operative to perform only some of the operations described with reference to FIG. 1A or FIG. 1B and perform additional operations which may or may not be performed in the system of FIG. 1A or FIG. 1B. As will be described in further detail below, in some embodiments, the operations performed to track the location of the asset 110, described with reference to FIG. 1A or 1B can be performed independently or in combination with the operations described with reference to FIG. 1C and FIG. 1D.

Figure 1C:
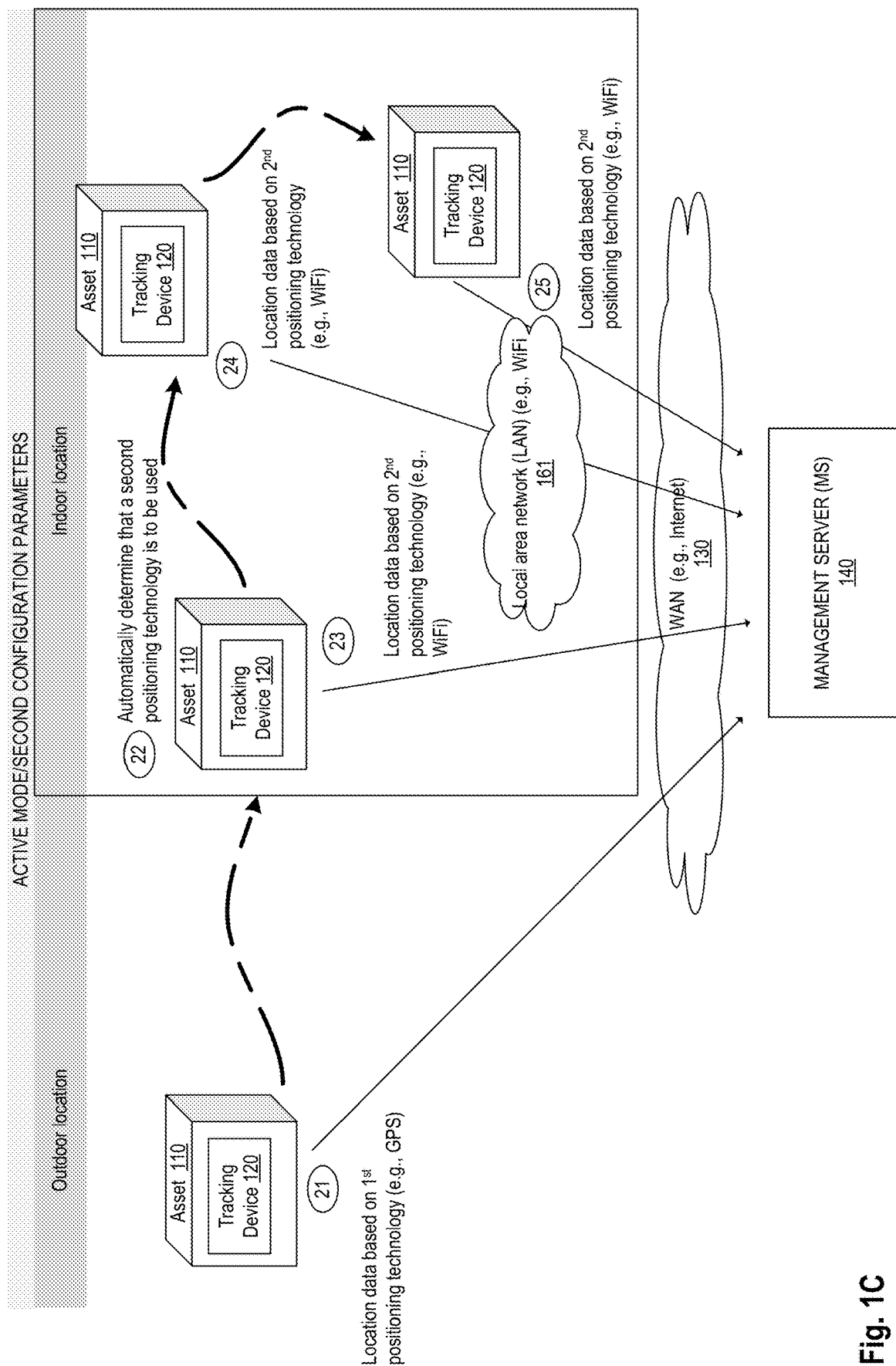
FIG. 1C illustrates a block diagram of exemplary deployment of a tracking device to track the location of the asset, when the asset moves from an outdoor to an indoor location, in accordance with some embodiments.

As an asset moves from an outdoor location to an indoor location or alternatively from an indoor location to an outdoor location, the tracking device is operative to transmit location data determined based on a first positioning technology during a first period of time and to transmit location data determined based on a second positioning technology during a second period of time, where the first positioning technology and the second positioning technology are different. FIG. 1C illustrates a block diagram of exemplary deployment of a tracking device to track the location of the asset, when the asset moves from an outdoor to an indoor location, in accordance with some embodiments. The tracking device 120 transmits, at operation 21, first location data determined based on a first positioning technology. For example, the tracking device 120 may be configured at initialization to determine location data based on a global positioning technology. In this first time, the asset 110 is located outdoors and the use of the first positioning technology, by the tracking device 120, allows an accurate determination of the location of the asset 110. Following the movement of the asset 110 to an indoor location, the tracking device 120 automatically determines, at operation 22, that a second positioning technology is to be used instead of the first positioning technology to determine the location of the asset 110, where the second positioning technology is different from the first positioning technology.

In some embodiments, determining that the second positioning technology is to be used instead of the first positioning technology can be performed by determining whether the first positioning technology is available to determine the location data of the asset 110. In these embodiments, upon determining that the first positioning technology is available, the tracking device 120 may continue to use the first positioning technology for determination of the location of the asset 110. Alternatively, upon determining that the first positioning technology is not available (e.g., no signal is received by the tracking device 120 based on the first positioning technology for a given period of time) the tracking device 120 automatically uses a second positioning technology for determination of the location of the asset 110. The second positioning technology can be a local positioning technology that provides more accurate and more precise location of the asset 110 in an indoor location when compared with the location of the asset 110 provided with the first positioning technology. The indoor location can be a warehouse, a manufacture, or any other location. For example, the local positioning technology may be performed by using one or more local access points of a local area network (e.g., LAN 161) and determining the location of the asset 110 based on the local access points. The tracking device 120 may use the second positioning location to determine at operation 23, operation 24, and operation 25 different location data of the asset 110 within the indoor location. In some non-limiting example, the second positioning technology can be based on Wi-Fi, e.g., using Wi-Fi triangulation techniques.

In some embodiments, determining that the second positioning technology is to be used instead of the first positioning technology can be performed by determining whether the asset has moved from an outdoor location to an indoor location. Upon determining that the asset is not in an indoor location, the tracking device 120 continues to use the first positioning technology to determine the location of the asset 110. Upon determining that the asset is in an indoor location, the tracking device 120 may automatically use the second positioning technology for determination of the location of the asset 110.

In some embodiments, determining that the second positioning technology is to be used instead of the first positioning technology can be performed by determining that the first positioning technology is not available and that the asset has moved to an indoor location. Alternatively, determining that the second positioning technology is to be used can be performed by determining that the first positioning technology is available and determining that the asset has moved to an indoor location.

Upon determining that the second positioning technology is to be used instead of the first positioning technology, the tracking device 120 transmits, at a second time that is later than the first time, second location data determined based on the second positioning technology. For example, the tracking device transmits at operation 23, location data indicating the location of the asset, where the location data is determined based on the second positioning technology. The tracking device 120 continues to determine the location of the asset 110 based on the second positioning technology, until the second positioning technology is no longer available and/or the asset moves from an indoor location to an outdoor location.

Figure 1D:
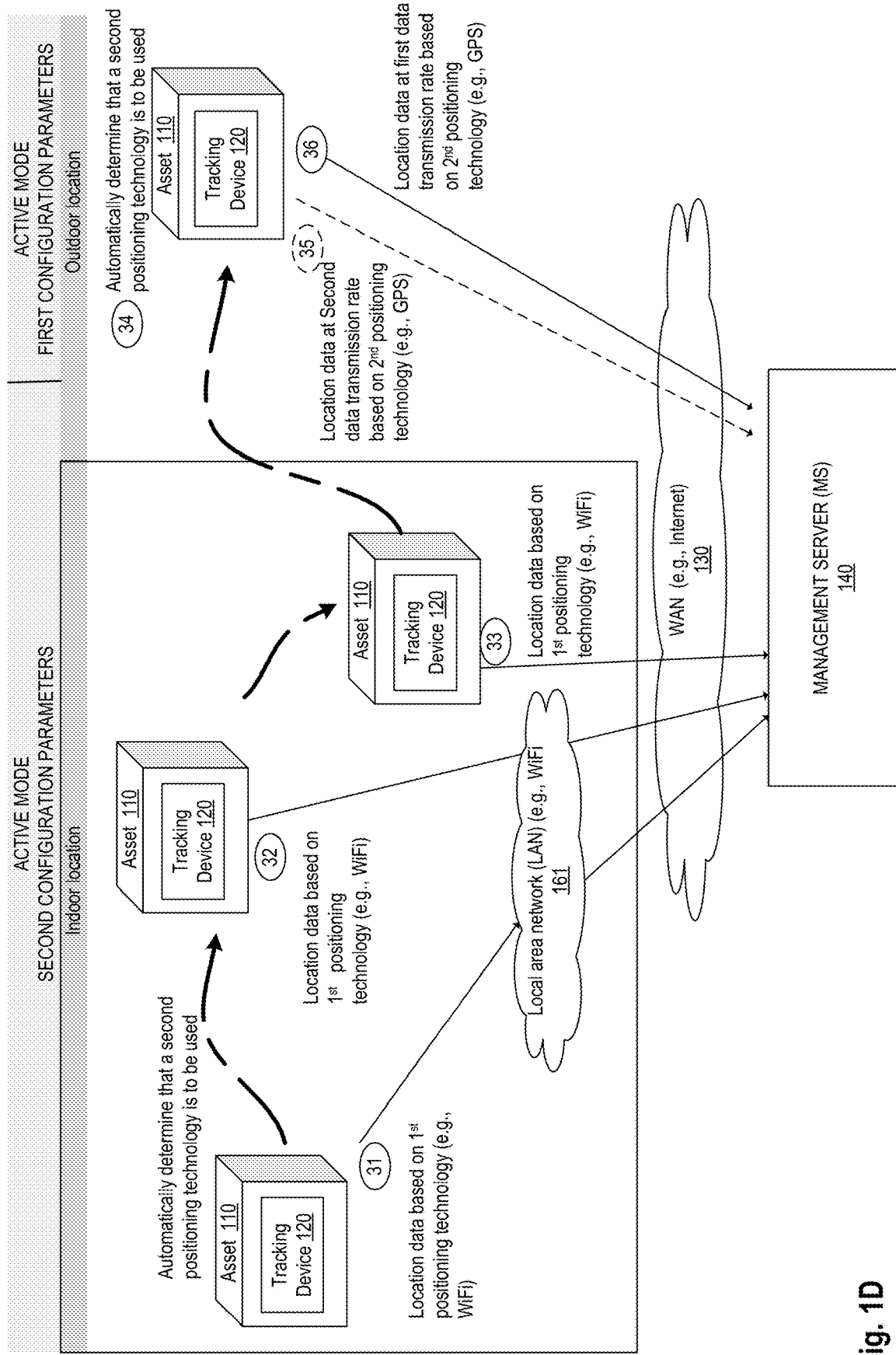
FIG. 1D illustrates a block diagram of exemplary deployment of a tracking device to track the location of the asset, when the asset moves from an indoor to an outdoor location, in accordance with some embodiments.

FIG. 1D illustrates a block diagram of exemplary deployment of a tracking device to track the location of the asset, when the asset moves from an indoor to an outdoor location, in accordance with some embodiments. The tracking device 120 transmits, at operation 31, first location data determined based on a first positioning technology. For example, the tracking device 120 may be configured at initialization to determine location data based on a local positioning technology (e.g., Wi-Fi triangulation). In this first time, the asset 110 is located indoors and the use of the first positioning technology, by the tracking device 120, allows an accurate and precise determination of the location of the asset 110. Following the movement of the asset 110 to another indoor location, the tracking device 120 continues to transmit, at operation 32 and operation 33, location data based on the first positioning technology. The local positioning technology allows the tracking device 120 to determine different locations of the asset 110 within an indoor location with greater precision than with the use of a global positioning technology. For example, the tracking device 120 may determine the location data based on access points of the LAN 161 and a location triangulation technique (e.g., Wi-Fi triangulation techniques).

In some embodiments, the tracking device 120 determines whether to use a second positioning technology that is different from the first positioning technology. In some embodiments, determining that the second positioning technology is to be used instead of the first positioning technology can be performed by determining whether the first positioning technology is available to determine the location data of the asset 110. In these embodiments, upon determining that the first positioning technology is available, the tracking device 120 may continue to use the first positioning technology for determination of the location of the asset 110. Alternatively, upon determining that the first positioning technology is not available (e.g., no signal is received by the tracking device 120 based on the first positioning technology for a given period of time) the tracking device 120 automatically uses a second positioning technology for determination of the location of the asset 110. The second positioning technology can be a global positioning technology that enables determination of the location of the asset 110. The tracking device 120 may use the second positioning location to determine at operation 35, location data of the asset 110 in an outdoor location. In some non-limiting example, the second positioning technology can be Global Positioning Technology (GPS).

In some embodiments, determining that the second positioning technology is to be used instead of the first positioning technology can be performed by determining whether the asset has moved from an indoor location to an outdoor location. Upon determining that the asset is no longer in an indoor location, the tracking device 120 starts using the second positioning technology to determine the location of the asset 110 instead of the first positioning technology. Upon determining that the asset is still in an indoor location, the tracking device 120 may continue to use the first positioning technology for determination of the location of the asset 110.

In some embodiments, determining that the second positioning technology is to be used instead of the first positioning technology can be performed by determining that the first positioning technology is not available, and that the asset has moved to an outdoor location. Alternatively, determining that the second positioning technology is to be used can be performed by determining that the first positioning technology is available and determining that the asset has moved to an outdoor location.

Upon determining that the second positioning technology is to be used instead of the first positioning technology, the tracking device 120 transmits, at a second time that is later than the first time, second location data determined based on the second positioning technology. For example, the tracking device 120 transmits at operation 35 and/or 36, location data indicating the location of the asset, where the location data is determined based on the second positioning technology. The tracking device 120 continues to determine the location of the asset 110 based on the second positioning technology, until the second positioning technology is no longer available and/or the asset moves from an outdoor location to an indoor location.

In some embodiments, the LAN 161 can be used to determine the location of the asset based on a local positioning technology and can further be used to transmit the data to/from the tracking device 120 and the management server 140. While the management server 140 is not typically located in the LAN 161, the LAN 161 enables transmission of the data through a wide area network (e.g., WAN 130 such as the Internet) between the tracking device 120 and the management server 140. In other embodiments, the LAN 161 can be used for the determination of the location of the asset while the transmission of the data to/from the tracking device is performed through another communication network such as a cellular network.

In some embodiments, the determination of the location of the asset can be performed based on a first positioning technology and based on a second positioning technology at different moments, while operating according to an active mode of operation as described with reference to FIG. 1B. Alternatively or additionally, the determination of the asset's location can be performed based on the first and/or second positioning technology while the asset operates in a first or second mode of operations depending on whether or not the asset 110 is in motion.

Figure 1E:
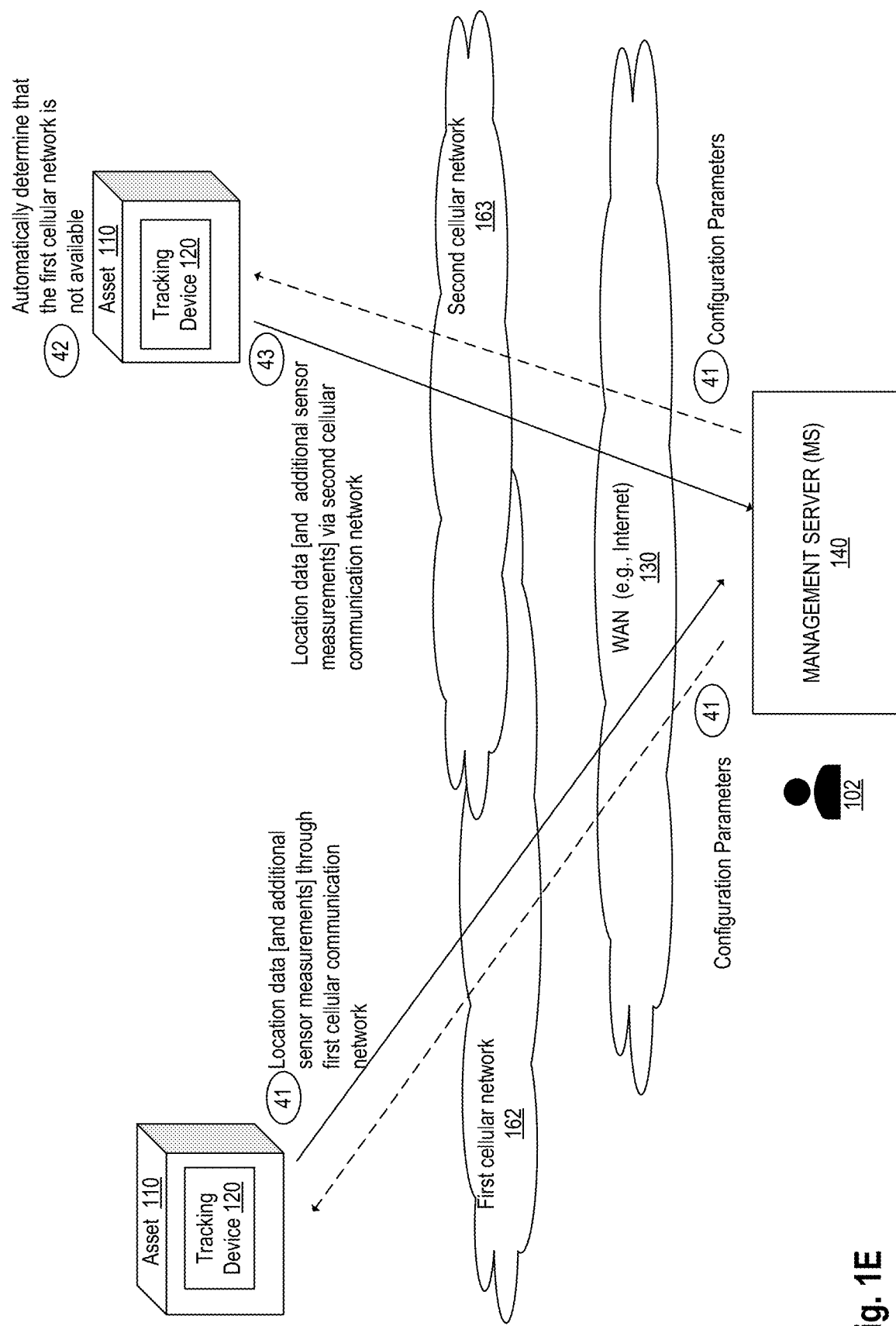
FIG. 1E illustrates a block diagram of exemplary deployment of a tracking device to track the location of the asset based on at least two cellular networks, in accordance with some embodiments.

Tracking Device Operating Based Multiple Cellular Networks:

FIG. 1E illustrates a block diagram of exemplary deployment of a tracking device to track the location of the asset based on at least two cellular networks, in accordance with some embodiments. To increase reliability of the data collected from the tracking device 120, the tracking device 120 is operative to transmit the data through a first communication network and a second communication network depending on availability of the networks.

At operation 41, the tracking device transmits the location data through a first cellular communication network, e.g., first cellular network 162. At a second time, the tracking device 120 automatically determines, at operation 42, that the first cellular network is not available. Responsive to determining that the first cellular network 162 is no longer available, the tracking device 120 transmits at operation 43, the data (e.g., location data and/or additional sensor measurements) through the second cellular network 163. The tracking device may include at least two subscriber identifiers (e.g., Subscriber Identification Modules (SIMs)) that allow the tracking device to communicate via a first cellular network 162 and a second cellular network 163. In some embodiments, the tracking device 120 is configured (e.g., through the receipt of the configuration parameters) to use the first cellular network associated with a first subscriber identifier as a default cellular network for transmission of data to/from the management server 140. The tracking device 120 may further be configured to use the second cellular network associated with the second subscriber identifier as a secondary cellular network. The tracking device 120 attempts to transmit data through the first cellular network and upon determining that the transmission of the data fails, automatically attempts to transmit the data through the second cellular network 163. In some embodiments, the failure of the data transmission through the first cellular network can be caused by the asset 110 moving from a first location, at which the first cellular network was available, to a second location, at which the second cellular network is available, and the first cellular network is no longer available. In other embodiments, the failure of the data transmission can be due to a temporary service interruption of the first cellular network causing the first cellular network to not be available.

While the embodiments described above show a first and a second cellular network that can be used for transmission of data to/from the tracking device 120, in other embodiments, the tracking device 120 can be operative to transmit the data through three or more cellular networks without departing from the scope of the inventive concept presented herein. The use of multiple cellular networks enables the tracking device 120 to continuously and reliably transmit data related to the state of the asset 110 to the management server 140.

In some embodiments, the tracking device 120 may further operate based on a smart mode of operation. The smart mode of operation may override all other modes of operation of the tracking device enabling for a further efficient use of the battery resource by allowing transmission of data only when the data is different from previously transmitted data. The tracking device 120 may receive updated configuration parameters, where the updated configuration parameters include an indication identifying a smart mode of operation that is to be used by the tracking device 120.

When operating in the smart mode of operation, the tracking device transmits new data location of the asset when the new data location is different from a previously transmitted data location. Prior to transmitting location data, the location data is compared with previously transmitted data and upon determining that the new location data is substantially identical to the latest data sent, the tracking device 120 does not transmit the new location data. Alternatively, upon determining that the new location data is different from the previously or latest location data transmitted, the tracking device transmits the new location data. The tracking device 120 further stores the new location data as the latest location data transmitted to the management server 140. This newly stored location data is used by the tracking device upon determination of whether future location data is to be transmitted or not.

The operations in the flow diagrams of FIGS. 2A-G will be described with reference to the exemplary embodiments of FIGS. 1A-E. However, it should be understood that the operations of the flow diagrams can be performed by embodiments of the invention other than those discussed with reference to FIGS. 1A-E, and the embodiments of the invention discussed with reference to FIGS. 1A-E can perform operations different than those discussed with reference to the flow diagrams.

FIG. 2A illustrates a flow diagram of exemplary operations performed in a tracking device for tracking the location of an asset, in accordance with some embodiments. At operation 202, the tracking device 120 receives configuration parameters. The configuration parameters are received from the management server 140. In some embodiments, the configuration parameters are received as a result of the user 102 selecting a set of parameters for operation of the tracking device 120. The selection of the configuration parameters can be performed through a user interface displayed on a device of the end user 102. The user interface is caused to be displayed by the management server 140 and allows the user 102 to enter the configuration parameters for configuring one or more tracking devices such as the tracking device 120. The configuration parameters can be received during an initialization phase of the tracking device 120 prior to deployment of the tracking device 120 in the field (e.g., when the tracking device 120 is already mounted on the asset 110 or not yet). In other embodiments, the configuration parameters can be received while the tracking device is already deployed and has been used in the field for a period of time. In these embodiments, the tracking device 120 may be mounted on the asset 110.

The configuration parameters may include the first configuration parameters and the second configuration parameters. In some embodiments, the configuration parameters may further include the pressure measurement thresholds, a mode of operations such as the smart mode and/or one or more additional parameters that determine the operations of the tracking device 120 when mounted on the asset 110. In some embodiments, the configuration parameters (including the first and the second configuration parameters) can be received in a single message from the management server 140. In other embodiments, the configuration parameters can be received in a first and a second message respectively.

In some embodiments, the configuration parameters are received through a connectionless communication protocol. In this embodiment, one or more messages of serialized structured data are received by the tracking device 120. The messages may include a message with the configuration parameters. In some embodiments, the serialization of the data to be received by the tracking device is performed based on a language-neutral, platform-neutral, extensible mechanism that minimizes data reporting/transmission overhead. The use of the connectionless communication protocol causes the tracking device 120 to receive reduced size data from the management server 140, making efficient use of the bandwidth between the tracking device 120 and the management server 140. These characteristics of the communication protocol, including the serialization of the structured data allows to further extend the life of the battery of the tracking device 120.

The first configuration parameters include a first data transmission rate and define a first mode of operation of the tracking device 120. The tracking device 120 is to use the first mode of operation when the asset 110 is stationary. The second configuration parameters include a second data transmission rate and define a second mode of operation of the tracking device 120. The tracking device 120 is to use the second mode of operation when the asset is mobile.

In some embodiments, the first configuration parameters include the first data transmission rate. In some embodiments, the data transmission rate can indicate a frequency (e.g., once a day, once a week, etc.) at which the location data is to be transmitted from the tracking device. In some embodiments, the data transmission rate can indicate one or more times of the day (e.g., 8 AM, 12 PM, etc.) at which location data is to be transmitted from the tracking device. In some embodiments, the first configuration parameters further include a first start time at which the tracking device is to start transmission of location data according to the first data transmission rate. The first configuration parameters are to be used when the asset is stationary and cause the battery life of the tracking device to be extended. For example, the first data transmission rate indicates that location data is to be transmitted from the tracking device 120 once per day, once every other day, or at any other data transmission rate desired by the user 102 for tracking the location of the asset, where the data transmission rate causes extension of the battery life in the tracking device 120. The first start time may indicate a date and a time of day at which the tracking device is to transmit the location data based on the first data transmission rate. For example, the tracking device 120 may be operating according to a mode of operation prior to the receipt of the configuration parameters, and the first start time indicates the date and time at which the tracking device is to transition from that mode of operation to the first mode of operation defined based on the first configuration parameters. The first configuration parameters may further include an identification of a set of one or more additional sensor measurements that are to be transmitted from the tracking device in addition to the location data. For example, the first configuration parameters may indicate that one of temperature measurements, pressure measures, or any other types of sensor measurements, or a combination of two or more of these measurements are to be transmitted from the tracking device 120 in addition to the location data. In some embodiments, the first configuration parameter may indicate a different data transmission rate for transmitting the additional sensor measurements such that the sensor measurements are transmitted at a data transmission rate that is different from the first data transmission rate. In these embodiments, the first configuration parameters may also indicate a start time for transmitting the additional sensor measurements that is different from the first start time. In other embodiments, the sensor measurements are transmitted at the same data transmission rate as the location data and at the same first start time.

In some embodiments, the second configuration parameters include a second data transmission rate. In some embodiments, the data transmission rate can indicate a frequency (e.g., once a day, once a week, etc.) at which the location data is to be transmitted from the tracking device. In some embodiments, the data transmission rate can indicate one or more times of the day (e.g., 8 AM, 12 PM, etc.) at which location data is to be transmitted from the tracking device. In some embodiments, the second configuration parameters may include motion definition parameters that are to be used for determining whether the tracking device is mobile or stationary. While the motion definition parameters are described as being received as part of the second configuration parameters, in some embodiments, the motion definition parameters can be received as part of the first configuration parameters instead. In another embodiment, the motion definition parameters can be pre-configured in the tracking device 120 prior to the receipt of the configuration parameters.

In some embodiments, the motion definition parameters define one or more criteria that need to be satisfied for the asset to be considered as being in motion. In some embodiments, the motion definition parameters can be determined based at least in part on sensor measurements. The motion definition parameters can be defined based on the application and type of deployment of the tracking device 120. The motion definition parameters can further vary depending on the type of asset 110 and the type of movement of the asset 110 may have. The motion definition parameter(s) can be determined by the user 102 based on observation of a test tracking device. The test tracking device can be the tracking device 120, alternatively, the test tracking device can be another tracking device similar to the tracking device 120. In some embodiments, a user interface is caused to be displayed on the user device of the user 102 by the management server 140, to enable a user 102 to configure and determine the motion definition parameter(s) for a given device on which a tracking device is mounted.

In some embodiments, the motion definition parameters may include a minimum amount of time during which the tracking device moves for the asset to be considered as being in motion. For example, the user may select that the asset needs to be moving for at least n seconds (e.g., 10 seconds, 30 seconds . . . ), n minutes (e.g., 2 minutes, 5 minutes, etc.), or other, in order for the asset to be considered as being in motion. In some embodiments, the motion definition parameter may include a minimum distance that needs to be traversed by the asset prior to it being considered to be in motion. In other embodiments, the motion definition parameter may include a minimum speed and/or acceleration in one or more directions that the speed or acceleration of the asset needs to exceed for the asset to be considered as being in motion. In some embodiments, the user 102 may select a motion pattern as a motion definition parameter for determining that the asset is in motion. For example, the motion definition parameters may include characteristics that define the motion pattern (e.g., the asset moving in a given direction for a first interval of time, the asset moving in another direction for a second interval of time, or any other motion pattern). In some example, while the asset may be located at the same physical location, it may be subject to other types of movement (e.g., vibration of the asset, vertical movement, etc.) that a user may want to detect. In these embodiments, the motion definition parameter may include one or more parameters for defining these movements and patterns (such as direction of movement, speed, acceleration, distance, time elapsed, etc.). While some examples of motion definition parameters are provided, other examples can be contemplated without departing from the scope of the present embodiments. The motion definition parameter enables a user to better define, which types of movement of the asset is to be considered as being in motion and can be used to cause the tracking device to enter or exit a motion-based mode of operation.

The second configuration parameters are to be used when the asset is mobile. In some embodiments, the second data transmission rate is greater than the first data transmission rate. For example, the second data transmission rate indicates that location data is to be transmitted from the tracking device 120 once every minute, every five minutes, once every ten minutes, or at any other data transmission rate desired by the user 102 for tracking the location of the asset when the asset is moving. The second data transmission rate causes the tracking device 120 to transmit more frequent location data when the asset is in motion consequently enabling a real time tracking of the asset.

In some embodiments, the second configuration parameters can include an optional second start time. The second start time may indicate a date and a time of day at which the tracking device is to operate based on the second configuration parameters if it determines that the tracking device is mobile. In other embodiments, the second configuration parameters do not include the second start time. The second configuration parameters may further include an identification of a set of one or more additional sensor measurements that are to be transmitted from the tracking device in addition to the location data. For example, the first configuration parameters may indicate that one of temperature measurements, pressure measures, or any other types of sensor measurements, or a combination of two or more of these measurements are to be transmitted from the tracking device 120 in addition to the location data. In some embodiments, the second configuration parameters may indicate a different data transmission rate for transmitting the additional sensor measurements such that the sensor measurements are transmitted at a data transmission rate that is different from the second data transmission rate. In some embodiments, the second configuration parameters may indicate that no other sensor measurements other than the location data are to be transmitted by the tracking device 120, causing the tracking device 120 to efficiently operate by reducing the amount of data transmitted when the asset is in motion.

The flow of operations moves from operation 202 to operation 204, at which the tracking device 120 automatically enters into an active mode of operation. In some embodiments, entering the active mode of operation can be performed as described with reference to FIG. 2B. In other embodiments, the tracking device can enter the active mode of operation upon initialization of the tracking device 120. In the active mode of operation, the tracking device operates in a first mode based on the first configuration parameters when the asset is stationary and operates in a second mode based on the second configuration parameters, when the asset is mobile according to operations 205-210. At operation 205, the tracking device 120 monitors the motion sensor measurements. At operation 206, the tracking device 120 determines based on the motion sensor measurements and the motion definition parameters whether the asset is moving or not. The sensor measurements can be recorded by a motion sensor located within the tracking device 120. In some embodiments, the motion sensor measurements can be a combination of sensor measurements detected with a first motion sensor located within the tracking device 120 and another sensor located outside of the tracking device 120. In other embodiments, the motion sensor measurements are recorded by a sensor that is located outside of the tracking device 120. Upon determining that the motion sensor measurements satisfy the criteria defined by the motion definition parameters, the tracking device 120 determines that the asset is in motion. Alternatively, upon determining that the motion sensor measurements do not satisfy the criteria defined by the motion definition parameter(s), the tracking device 120 determines that the asset is stationary. In some embodiments, the motion sensor can be an accelerometer.

At operation 208, in response to determining, based on first motion sensor measurements, that the asset is stationary, the tracking device 120 transmits, at the first data transmission rate, first location data of the asset. In response to determining, based on the motion sensor measurements, that the asset is mobile (i.e., has started moving), the tracking device 120 transmits, at operation 210, based on the second data transmission rate, second location data of the asset to the management server.

In some embodiments, the tracking device 120 can be configured based on first motion definition parameters during a first time interval and based on a second motion definition parameters during a second time interval. In this embodiment, the definition of being in motion for an asset can vary from a first period of time to a second period of time. In some embodiments, the tracking device 120 may be configured to determine whether the asset is moving or not based on the first motion definition parameters and may receive new motion definition parameters, e.g., included in updated configuration parameters received at a later time, such that detection of a movement of the asset can be performed based on the new set of motion definition parameters. This can be used to detect a type of movement of the asset during a second interval of time that is different from the type of movement of the asset detected during the first interval of time. For example, in the first interval of time, the asset is expected to remain stationary at a location, and any movement of the asset can be determined to be fraudulent and may need to be detected. During this first interval of time, the tracking device 120 is configured based on the first motion definition parameter that enable the detection of any movement of the asset 110. In a second interval of time, the asset is expected to be moved within a given set of parameters but not according to another set of parameters (e.g., the asset can be moved inside a warehouse with a trolley but not outside in a vehicle). These different types of movements (e.g., inside warehouse vs. being transported in a vehicle) can be defined based on different motion definition parameters. In particular, the second motion definition parameter can be used to define a second type of movement of the asset (e.g., the asset is being transported on a vehicle). The tracking device 120 is configured to operate in the second mode of operation (i.e., to transmit data according to the second data transmission rate) only when the second motion definition parameters are detected (i.e., when the sensor measurements are determined to satisfy the criteria defined in the second motion definition parameters (e.g., where these parameters define that the asset is being transported on a vehicle outside a warehouse)). In this exemplary embodiment, when the asset moves but the tracking device 120 determines that the motion sensor measurements do not satisfy the criteria of the second motion definition parameters (e.g., the motion sensor measurements do not satisfy the criteria defined in the second motion definition parameters), the tracking device 120 continues to operate in the first mode of operation (stationary mode of operation), by transmitting data according to the first data transmission rate. The tracking device 120 operates in the second mode of operation (motion-based mode of operation), by transmitting data at the second data transmission rate, only upon determination that the criteria of the second motion definition parameters are satisfied.

The embodiments discussed above present a mechanism for operation of a tracking device that is based on whether or not the asset on which the tracking device is mounted is moving. Further, the mode of operations presented herein depend on the type of asset and the type of movement that the asset can have as the determination of whether an asset is moving is performed based on motion definition parameters that are configurable. In the described embodiments, when an asset is determined to be stationary based on the motion definition parameters, the tracking device transmits less frequent data to the management server (for example, once a day). In contrast, when the asset moves, even unexpectedly, the tracking device is configured to automatically switch from the stationary mode of operation to the mobile mode of operation, such that the data is transmitted more frequently (e.g., every 5 minutes). Using this mechanism, the potential recovery time of a stolen asset is enabled in real-time, while still allowing for the life of the battery of the tracking device to be extended by an efficient use of the transmission link of the tracking device when the tracking device is stationary.

The embodiments described herein further enable the tracking device to operate in a stationary mode of operation (by transmitting less frequent data to the management server) even when the asset is mobile. The operation in the stationary mode depends on the motion definition parameters that allow a user/administrator of the asset on which the tracking device is mounted to define the state of "being in motion". For example, the user may determine that a movement of the asset in a given direction or at a given speed/acceleration may not need to be considered as being in motion, while a movement of the asset in another direction or at another speed/acceleration is to be considered as being in motion. In other examples, the asset may not be considered to be in motion if it moves only in a given orientation (e.g., it is moving horizontally only, or vertically only). In another example, the asset may not be considered as being in motion if it is determined that it is moving within a given geofenced area. In other examples, the asset may not be considered to be in motion if it is moving under a predetermined speed threshold, for less than a predetermined time interval, or below a predetermined minimum distance, etc.). This provides a greater flexibility in the use of the dual mode of operation stationary/mobile mode of operation and further allows to extend the battery life of the tracking device.

FIG. 2B illustrates a flow diagram of exemplary operations performed in a tracking device for transmission of data at a second data transmission rate, in accordance with some embodiments. In some embodiments, transmitting location data based on a second data transmission rate may include operations 218-222. At operation 218, the tracking device 120 transmits a first location reading upon automatically detecting, based on the motion definition parameter, that the tracking device has started moving. At operation 220, the tracking device 120 transmits additional location data including one or more additional location readings based on the second data transmission rate while the asset 110 is determined to be moving. At operation 222, the tracking device 120 transmits, to the management server, a second location reading upon automatically determining, based on the motion definition parameters, that the tracking device has stopped moving. The first location reading indicates the location at which the asset has started moving. The second location reading indicates the location at which the asset has stopped. The first and the second location readings are automatically identified by the tracking device 120, based on the first motion definition parameters.

Figure 2C:
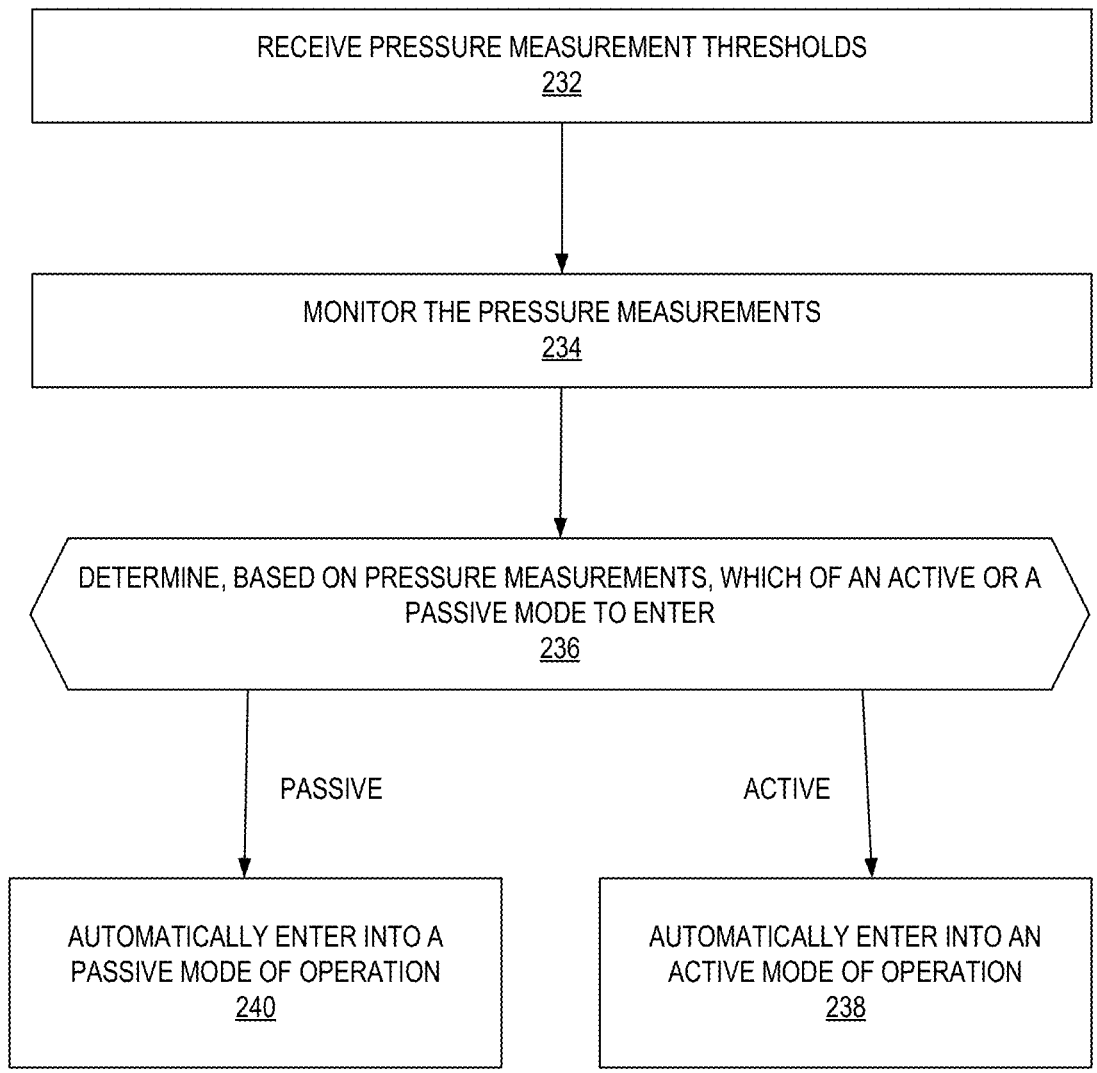
FIG. 2C illustrates a flow diagram of exemplary operations performed in a tracking device for transmission of data based on an active and a passive mode of operations, in accordance with some embodiments.

FIG. 2C illustrates a flow diagram of exemplary operations performed in a tracking device for transmission of data based on an active and a passive mode of operation, in accordance with some embodiments. At operation 232, the tracking device 120 receives pressure measurement thresholds. In some embodiments, the pressure measurement thresholds can be included as part of the configuration parameters received by the tracking device 120. In some embodiments, the pressure measurement thresholds can be input by the user 102. In other embodiments, the sensor measurement thresholds can be automatically determined by the management server 140. The management server 140 may receive an indication from the user that the tracking device is to be configured for operation based on passive/active modes and in response to receiving this indication, the management server 140 determines a set of one or more pressure measurement thresholds.

At operation 234, the tracking device 120 automatically monitors the pressure measurements recorded by a pressure sensor to determine the pressure of the asset. For example, a pressure sensor may repeatedly record pressure measurements at a given interval of time (e.g., every n ms, n seconds, or n minutes, etc.). In some embodiments, the pressure sensor may be located within the tracking device 120, while in other embodiments, the pressure sensor may be located outside of the tracking device 120 and coupled with the tracking device 120 through a short-range communication link. The pressure sensor is to record pressure measurements indicating the pressure to which the asset is submitted (e.g., air pressure).

At operation 236, the tracking device 120 determines based on pressure measurements which of an active or a passive mode the tracking device is to enter. At operation 238, the tracking device 120 automatically enters, based on pressure measurements, into an active mode of operation. In some embodiments, the tracking device 120 may determine to enter the active mode upon determination that no change in the pressure measurements is detected when compared with previously recorded pressure measurements.

In some embodiments, when the tracking device 120 is operating in the active mode, the tracking device 120 can perform the operations described with reference to FIG. 2A. In other embodiments, when operating in the active mode, the tracking device 120 may be operative to transmit data (including location data) to the management server based on a single data transmission rate and configuration parameters. For example, the tracking device can operate based on a smart mode of operation in addition to the active mode of operation, such that data is transmitted only when the new data is different from previously transmitted data.

Figure 2D:
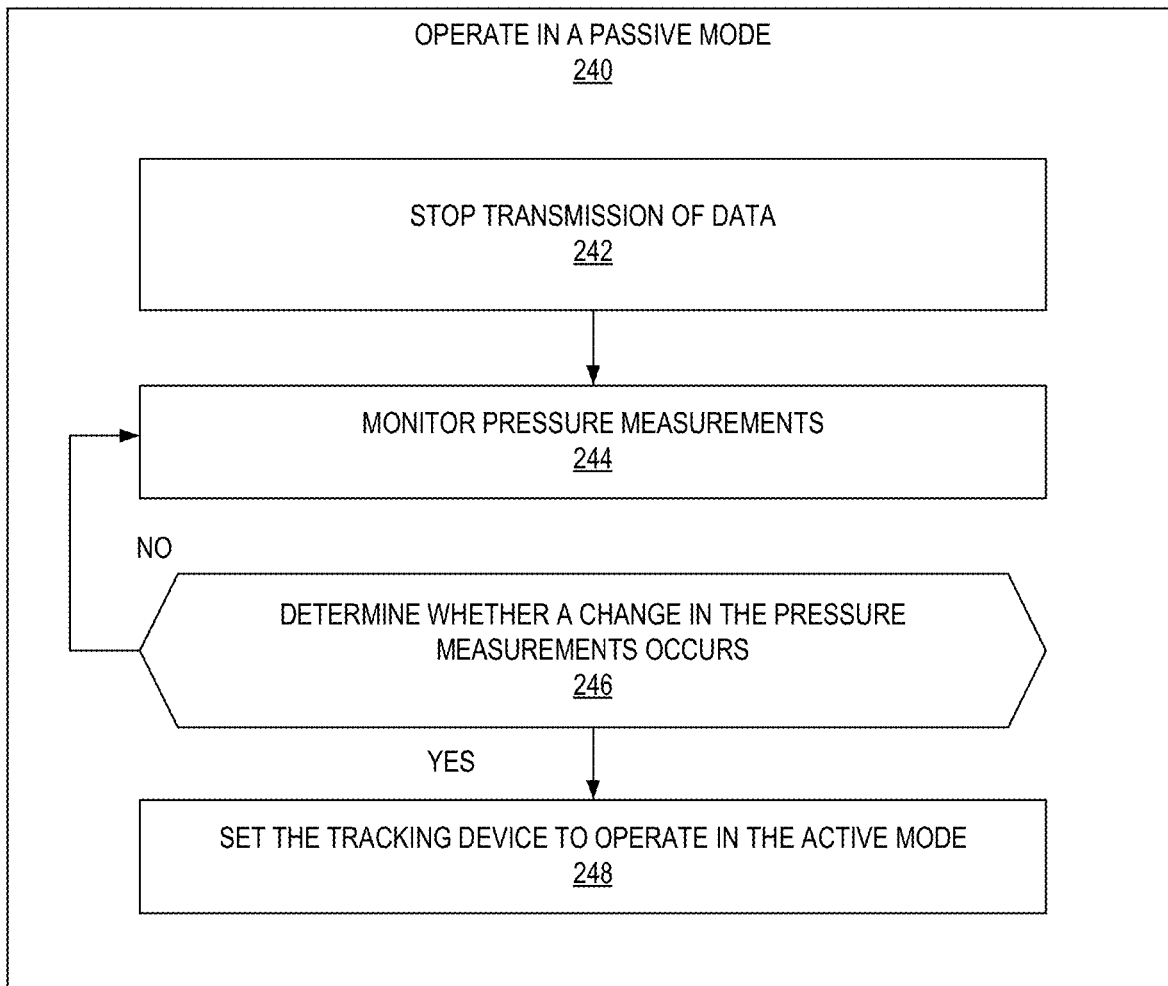
FIG. 2D illustrates a flow diagram of exemplary operations performed in a tracking device when operating in a passive mode, in accordance with some embodiments.

In other embodiments, the tracking device 120 may determine to enter, at operation 240, a passive mode of operation. FIG. 2D illustrates a flow diagram of exemplary operations performed in a tracking device when operating in a passive mode, in accordance with some embodiments.

When operating in a passive mode of operation no data is transmitted from or received by the tracking device 120. At operation 242, the tracking device 120 stops transmission of data. For example, the tracking device 120 may disable any interfaces used for communication with the management server (e.g., cellular communication interfaces) causing the tracking device to no longer transmit or receive data to/from the management server 140. In some embodiments, the tracking device 120 may continue to transmit/receive data through short range communication interfaces (such as Wi-Fi, or Blue Tooth Low Energy (BLE)). In other embodiments, all communication is disabled, and no data is transmitted to/from the tracking device 120. In some embodiments, when operating in the passive mode, the tracking device 120 may continue to monitor, at operation 244, the pressure measurements. The tracking device 120 may further record zero or more other sensor measurements (e.g., temperature measurement, etc.). In some embodiments, when operating in the passive mode, the tracking device 120 may no longer determine the location of the asset. For example, when the location of the asset is determined based on a first positioning technology, such as Global Positioning Technology (GPS), the tracking device 120 pauses the acquisition of GPS coordinates when it enters the passive mode of operation.

The tracking device 120 remains in the passive mode of operation until a change in the pressure measurements occurs. At operation 246, the tracking device 120 determines whether a change in the pressure measurements occurs. For example, when the asset 110 is moved from an airplane to a warehouse, the tracking device 120 automatically determines that the pressure measurements have changed when compared with previously recorded pressure measurements and automatically re-enters the active mode, at operation 248. When operating in the active mode, transmission of data to/from the tracking device 120 is resumed. In some embodiments, the transmission of data can be performed based on a first data transmission rate. In other embodiments, when operating in the active mode, the transmission of data can be performed based on a first or a second data transmission rate (i.e., based on a first or second mode of operation) depending on whether the asset is mobile or not as described with reference to FIG. 2A. In other embodiments, the transmission of data can be performed based on a smart mode of operation as described with reference to FIG. 2G.

The embodiments described herein allow the tracking device to track the location of the asset on which it is mounted based on pressure measurements to which the asset is subjected to. These mechanisms allow the tracking device to comply with rules and regulations that may be set for transportation of the asset. For example, when the asset is transported on an airplane, the tracking device automatically stops transmission and receipt of data to comply with aviation and safety regulations without requiring a manual intervention of a user for shutting down or turning off the tracking device. Further the tracking device 120 automatically turns transmission of data back on upon determination that a change in the pressure measurements has occurred and that the asset is no longer on an airplane. While the embodiments herein are described with reference to an asset being placed on an airplane, this is intended to be illustrative only to present changes that may occur in the pressure measurements of an asset. This example should not be regarded as limiting and other examples can be contemplated without departing from the scope of the inventive concept presented herein. Other locations and/or environments can cause a change in the pressure measurements and this change automatically causes the tracking device to enter the passive or the active mode of operation. In addition, the operation of the tracking device 120 in the passive mode further allows the tracking device 120 to extend its battery life by ensuring that the energy draining operation of data transmission is not performed when it is not needed.

Figure 2E:
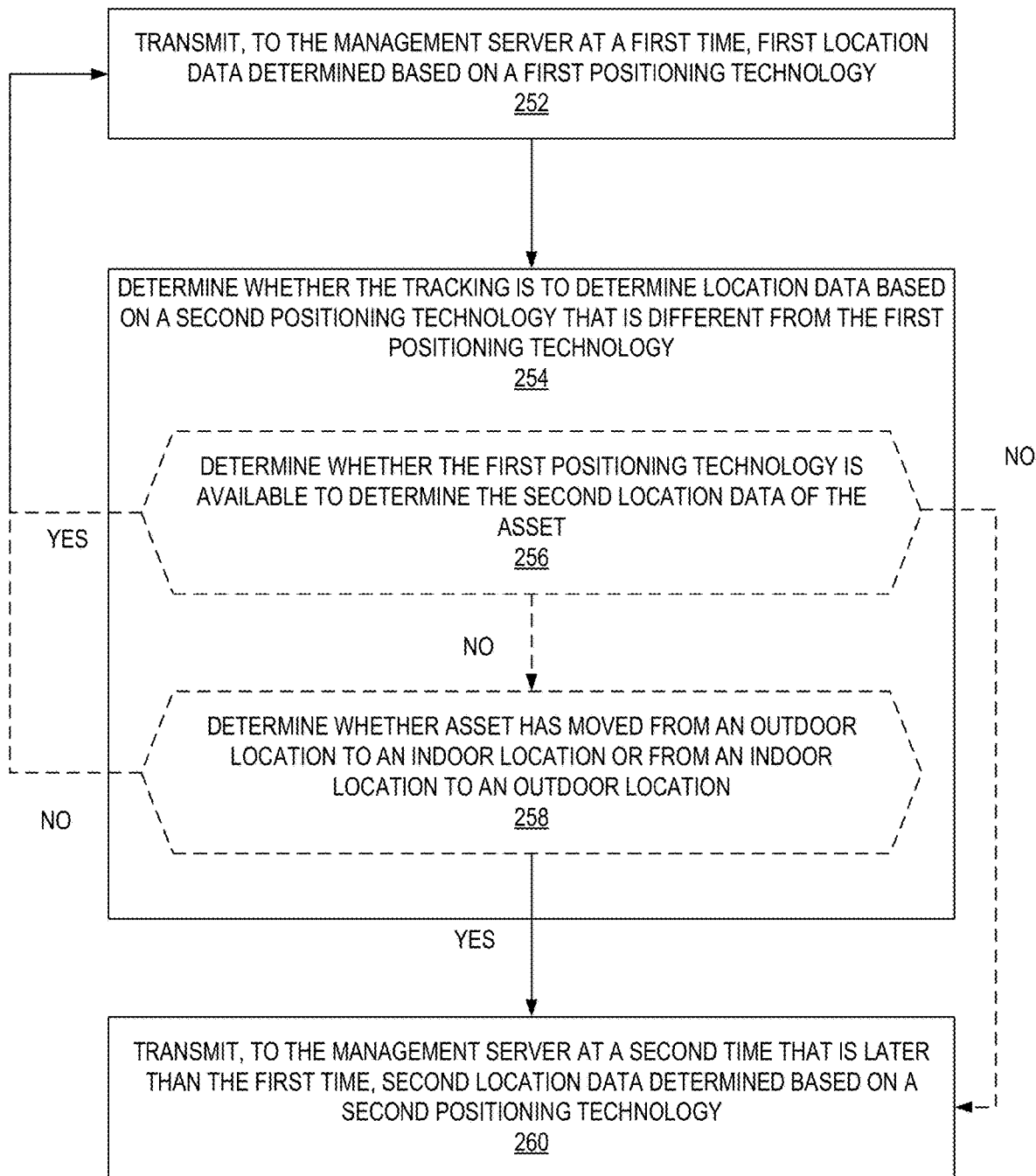
FIG. 2E illustrates a flow diagram of exemplary operations performed in a tracking device based on multiple positioning technologies, in accordance with some embodiments.

FIG. 2E illustrates a flow diagram of exemplary operations performed in a tracking device based on multiple positioning technologies, in accordance with some embodiments. At operation 252, the tracking device 120 transmits first location data determined based on a first positioning technology. For example, the tracking device 120 may be configured at initialization to determine location data based on the first positioning technology. In some embodiments, the first positioning technology is a local positioning technology, while in other embodiments, the first positioning technology is a global positioning technology.

The local positioning technology may be performed by using one or more local access points of a local area network (e.g., LAN 161) and determining the location of the asset 110 based on the LAN. In some embodiments, the LAN and the asset can be located indoors when the local positioning technology is used. In other embodiments, the asset can be located outdoor and the tracking device 120 may determine to use the local positioning technology instead of the global positioning technology. The tracking device 120 may use the local positioning location to determine different location data of the asset 110 within a same indoor location. In some non-limiting example, the local positioning technology can be based on Wi-Fi, e.g., using Wi-Fi triangulation techniques. The local positioning technology allows the tracking device 120 to determine different locations of the asset 110 within an indoor location with greater precision than with the use of a global positioning technology.

In some embodiments, the first positioning technology can be a global positioning technology. For example, the tracking device 120 may be configured at initialization to determine location data based on a global positioning technology. For example, in this first time, the asset 110 is located outdoors and the use of the first positioning technology, by the tracking device 120, allows an accurate determination of the location of the asset 110. The tracking device 120 may include a location sensor that is operative to implement the global positioning technology. For example, the location sensor can be a Global Positioning System (GPS) sensor and the location reading includes GPS coordinates.

At operation 254, the tracking device 120 determines whether to use a second positioning technology that is different from the first positioning technology for determining the location data. In some embodiments, determining that the second positioning technology is to be used instead of the first positioning technology can be performed by determining, at operation 256, whether the first positioning technology is available to determine the location data of the asset 110. In these embodiments, upon determining that the first positioning technology is available, the tracking device 120 may continue to use the first positioning technology for determination of the location of the asset 110. Alternatively, upon determining that the first positioning technology is not available (e.g., no signal is received by the tracking device 120 based on the first positioning technology for a given period of time) the tracking device 120 may automatically use a second positioning technology for determination of the location of the asset 110 (operation 260). The second positioning technology can be a global positioning technology that enables determination of the location of the asset 110 or alternatively a local positioning technology. The tracking device 120 may use the second positioning location to determine at operation 260, location data of the asset 110.

In some embodiments, determining that the second positioning technology is to be used instead of the first positioning technology can be performed by determining, at operation 258, whether the asset has moved from an indoor location to an outdoor location or alternatively, whether it has moved from an outdoor location to an indoor location. In one embodiment, upon determining that the asset is no longer in an indoor location, the flow of operations moves to operation 260, at which the tracking device 120 starts using the second positioning technology to determine the location of the asset 110 instead of the first positioning technology. In this embodiment, the second positioning technology is a global positioning technology such as GPS. In another embodiment, upon determining that the asset is no longer in an outdoor location but instead has moved to an indoor location, the flow of operations moves to operation 260, at which the tracking device 120 starts using the second positioning technology to determine the location of the asset. In this embodiment, the second positioning technology is a local positioning technology (e.g., Wi-Fi triangulation).

In some embodiments, determining that the second positioning technology is to be used instead of the first positioning technology can be performed by determining that the first positioning technology is not available, and that the asset has moved to a different location (e.g., to an indoor location). Alternatively, determining that the second positioning technology is to be used can be performed by determining that the first positioning technology is available and determining that the asset has moved to another location (e.g., an indoor location).

Upon determining that the second positioning technology is to be used instead of the first positioning technology, the tracking device 120 transmits, at a second time that is later than the first time at operation 260, second location data determined based on the second positioning technology.

In some embodiments, the determination of the location of the asset can be performed based on a first positioning technology and based on a second positioning technology at different moments, while operating according to an active mode of operation as described with reference to FIG. 1B. Alternatively or additionally, the determination of the asset's location can be performed based on the first and/or second positioning technology while the asset operates in a first or second mode of operation depending on whether or not the asset 110 is in motion.

Figure 2F:
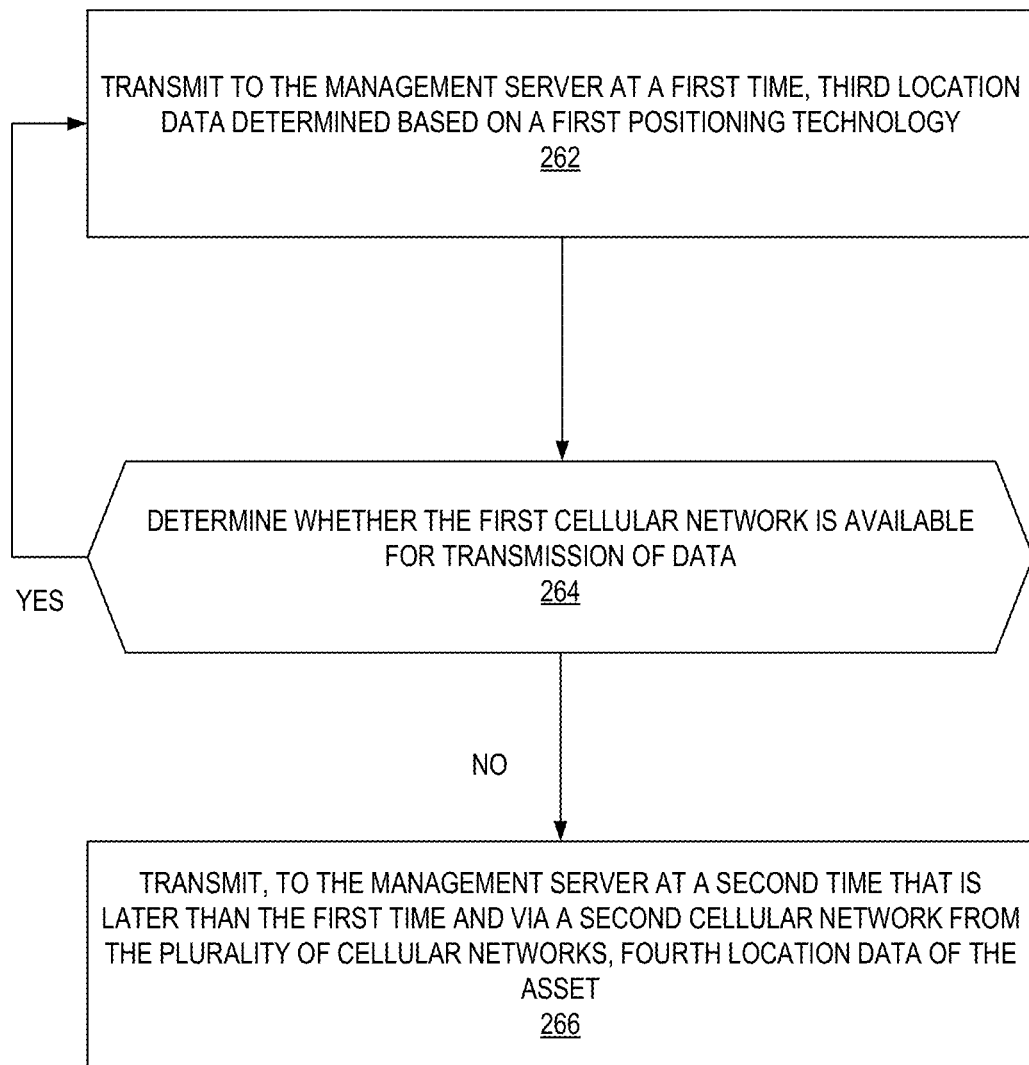
FIG. 2F illustrates a flow diagram of exemplary operations performed by a tracking device that is operative to use multiple cellular communication networks, in accordance with some embodiments.

FIG. 2F illustrates a flow diagram of exemplary operations performed by a tracking device that is operative to use multiple cellular communication networks, in accordance with some embodiments. To increase reliability of the data collected from the tracking device 120, the tracking device 120 is operative to transmit the data through a first communication network and a second communication network depending on availability of the networks.

At operation 262, the tracking device 120 transmits the data (including the location data) through a first cellular communication network, e.g., first cellular network 162. At a second time, the tracking device 120 automatically determines, at operation 264, whether the first cellular network is available. Responsive to determining that the first cellular network 162 is no longer available, the tracking device 120 transmits at operation 266, the data (e.g., location data and/or additional sensor measurements) through the second cellular network 163. The tracking device may include at least two subscriber identifiers (e.g., Subscriber Identification Modules (SIMs)) that allow the tracking device to communicate via a first cellular network 162 and a second cellular network 163. In some embodiments, the tracking device 120 is configured (e.g., through the receipt of the configuration parameters) to use the first cellular network associated with a first subscriber identifier as a default cellular network for transmission of data to/from the management server 140. The tracking device 120 may further be configured to use the second cellular network associated with the second subscriber identifier as a secondary cellular network. In some embodiments, determining whether the first cellular network is available includes the tracking device 120 attempting to transmit data through the first cellular network and upon determining that the transmission of the data fails, automatically attempting to transmit the data through the second cellular network 163. In some embodiments, the failure of the data transmission through the first cellular network can be caused by the asset 110 moving from a first location, at which the first cellular network was available, to a second location, at which the second cellular network is available, and the first cellular network is no longer available. In other embodiments, the failure of the data transmission can be due to a temporary service interruption of the first cellular network causing the first cellular network to not be available.

While the embodiments described above show a first and a second cellular network that can be used for transmission of data to/from the tracking device 120, in other embodiments, the tracking device 120 can be operative to transmit the data through three or more cellular networks without departing from the scope of the inventive concept presented herein. The use of multiple cellular networks enables the tracking device 120 to continuously and reliably transmit data related to the state of the asset 110 to the management server 140.

Figure 2G:
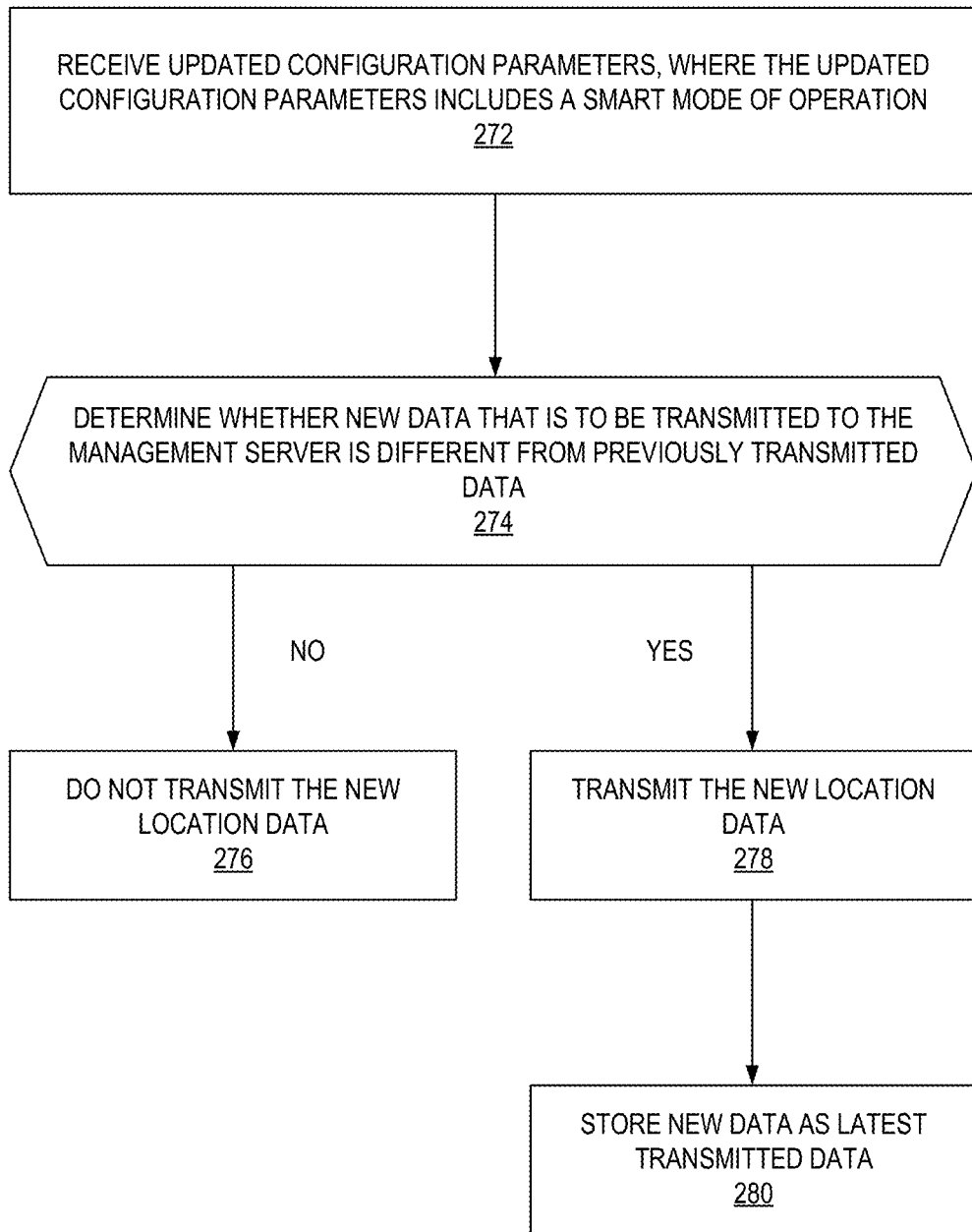
FIG. 2G illustrates a flow diagram of exemplary operations performed in a tracking device, in accordance with some embodiments.

FIG. 2G illustrates a flow diagram of exemplary operations performed in a tracking device, in accordance with some embodiments. In some embodiments, the tracking device 120 may further operate based on a smart mode of operation. In some embodiments, the smart mode of operation may override all other modes of operation of the tracking device. In other embodiments, the smart mode of operation may be used in combination with other modes of operation described herein. The smart mode of operation enables the tracking device 120 to efficient use of the battery resource by allowing transmission of data only when the data is different from previously transmitted data. The tracking device 120 may receive, at operation 272, updated configuration parameters, where the updated configuration parameters include an indication identifying a smart mode of operation that is to be used by the tracking device 120.

When operating in the smart mode of operation, the tracking device transmits new data (e.g., new location data and/or new sensor measurements) of the asset when the new data is different from a previously transmitted data. At operation 274, the tracking device determines whether new data that is to be transmitted is different from previously transmitted data. Prior to transmitting the data, the data is compared with previously transmitted data and upon determining that the new data is substantially identical to the latest data sent, the tracking device 120 does not transmit, at operation 276, the new data. Alternatively, upon determining that the new data is different from the previously or latest data transmitted, the tracking device 120 transmits, at operation 278, the new data. The tracking device 120 further stores, at operation 280, the new data (e.g., the new location data) as the latest location data transmitted to the management server 140. This newly stored location data is used by the tracking device upon determination of whether future location data is to be transmitted or not.

The embodiments described herein present a tracking device that can be used for reliably and efficiently tracking the location of an asset. The asset is expected to travel (move on its own or be moved) through multiple locations. The tracking device is operative to: 1) be mounted on the asset; 2) operate even if its connection with a management server is unreliable; 3) efficiently operate off its battery, without an external power source and to operate based on one or several modes of operations that extend the battery life of the tracking device causing the tracking device to be available for an extended period of time; 4) track the locations of the asset tracking device (and thus the asset to which the asset tracking device is attached) when the asset is moved indoors and/or outdoors; and 5) communicate with the management server via multiple networks when outdoors. Several mechanisms presented herein enable the tracking device to extend its battery life while ensuring reliable transmission and reporting of data to a management server.

While the embodiments described with reference to FIGS. 1A-2G illustrate a management server 140 that communicates with a single tracking device 120, in some embodiments, the management server 140 may communicate with multiple tracking devices that are used for tracking multiple assets. In some embodiments, the assets may belong to a same organization (a tenant/customer of the tracking service offered through the management server) or to multiple organizations (multiple tenants/customers of the tracking service).

Architecture

The tracking device and the management server described with reference to FIGS. 1A-2G are electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices. One or more parts of an embodiment of the invention may be implemented using different combinations of software, firmware, and/or hardware.

FIG. 3A illustrates a block diagram of an exemplary tracking device that can be used in some embodiments. Tracking device 300 includes one or more processors 305. The tracking device 300 includes computer readable storage medium 310, which is coupled to the processor(s) 305. The computer readable storage medium 310 may be used for storing data, metadata, and programs for execution by the processor(s) 305. For example, the depicted computer readable storage medium 310 may store a management module that, when executed by the processor(s) 305, causes the tracking device 300 (e.g., tracking device 120) to reliably and securely offload data from a WSD and to transmit the data to the management server regardless of whether the connectivity of the tracking device is intermittent. The data management module may include code which when executed on the processor(s) 305 cause the tracking device to store data indicative of sensor measurements received from a WSD, and transmit the data to a management server based on one or more modes of operation as described with reference to FIGS. 1A-2G.

The tracking device 300 also includes one or more communication interfaces 306, which are provided to allow a user to provide input to, receive output from, and otherwise transfer data to and from the system. Exemplary Input/Output devices and interfaces 206 include wired and wireless transceivers, such as Joint Test Action Group (JTAG) transceiver, a Bluetooth Low Energy (LE) transceiver 329, an IEEE 802.11 transceiver 327, an infrared transceiver, a multi-cellular telephony transceiver (e.g., 2G, 3G, 4G) 328, or another wireless protocol to connect the tracking device 300 with another device, external component, or a network and receive stored instructions, data, tokens, etc. It will be appreciated that one or more buses may be used to interconnect the various components shown in FIG. 3A.

The tracking device 300 may also include one or more sensor(s) to detect physical events and store sensor measurements in the computer readable storage medium 310 in response to the detection of the physical events. In some exemplary embodiments, the one or more sensor(s) include at least one of a motion sensor 323 (e.g., accelerometer), a pressure sensor 324. The tracking device 300 may further include one or more additional sensors, such as the temperature sensor 325, an ambient light sensor, and a gyroscope, etc. The tracking device includes a first positioning system 326. The positioning system can be a GPS sensor and may be part of the sensors 322. The tracking device also includes a second positioning system 332.

The tracking device 300 includes a battery 321. The battery 321 is used to power the tracking device 300. The battery 321 can be replaceable. Each of the elements of the tracking device 300 (except the battery 321) are power consuming components that operate with power received from the battery 321. In some embodiments, the tracking device 300 may include additional power consuming elements 330.

In some embodiments, the tracking device 300 may include a multi-use button that enables actuation of several operations to be performed by the tracking device 300. For example, the multi-use button can be used to trigger data transmission on demand. When pressed by a user, the button causes the tracking device to transmit current sensor measurement data (e.g., location data and/or other sensor measurements) to the management server. The multi-use button may also be used to activate a tracking device that is in a passive mode of operation. In some embodiments, the multi-use button can be used to reboot the asset tracking device. The multi-use button can be used to trigger diagnostics operations of the tracking device 300. The diagnostics performed by the asset tracking device causes a light-emitting diode (LED) to blink according to different patterns to indicate the type of problems in the device. Each blinking pattern of the LED can be associated with a different cause of malfunction of the tracking device and allows a user to immediately identify the malfunction without requiring lengthy and in-depth diagnostics of the tracking device by the user.

The tracking device 300 includes a BLE transceiver 329. The BLE transceiver 329 can be used to enable the tracking device 300 to connect with one or more external WSDs. In some embodiments, the tracking device 300 may establish communication channels with one or more WSDs. In some embodiments, the communication channels are secure such that only authorized and authenticated WSDs can connect with the tracking device 300. In an exemplary embodiment, the devices may negotiate the establishment of the secure communication channel using a shared secret and an encryption protocol (e.g., Bluetooth Low Energy (BLE) Secure Connections pairing model). In an embodiment, the secret is burnt in the WSD 115 at the time of manufacture. In some embodiments, the connection is performed according to a BLE pairing mechanism, where the tracking device scans for nearby WSDs which are not yet paired to another gateway device or another tracking device and detects the advertisement(s) transmitted by the WSDs. When the secure communication is established, the WSDs may transmit any recorded sensor measurements to the tracking device that are received via the BLE transceiver 329. The pairing with the WSDs enables the detection and understanding of the presence of other assets (e.g., WSDs) that are located in the vicinity of the tracking device. In some embodiments, the BLE transceiver 329 may additionally or alternatively enable the tracking device to perform real time event detection and to trigger an action on and/or control on one more actuators.

It will be appreciated that additional components, not shown, may also be part of the tracking device 300, and, in certain embodiments, fewer components than that shown in FIG. 3 may also be used in a tracking device 300.

Figure 3B:
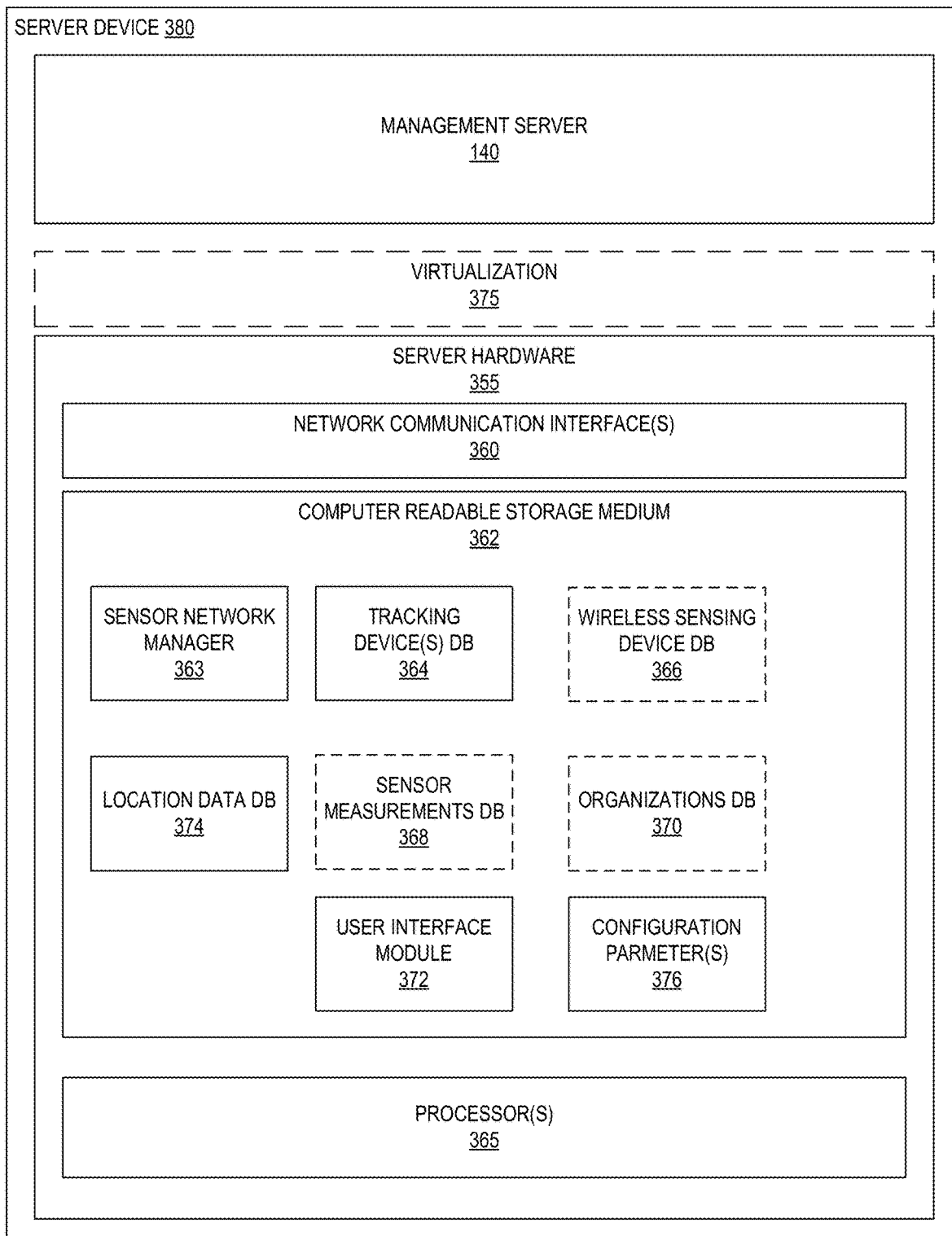
FIG. 3B illustrates a block diagram for an exemplary server management that can be used in some embodiments.

FIG. 3B illustrates a block diagram for an exemplary management server that can be used in some embodiments. Management server 140 may be a Web or cloud server, or a cluster of servers, running on server hardware. In one embodiment, the management server 140 works for both single and multi-tenant installations, meaning that multiple organizations with different administrators may have wireless sensing devices and/or tracking devices managed by the same management server.

According to one embodiment, management server 140 is implemented on a server device 380 which includes server hardware 355. Server hardware 355 includes network communication interfaces 360 coupled with one or more processor(s) 365, and a computer readable storage medium 362. The computer readable storage medium 362 includes a sensor network manager 363 used to configure and manage the WSDs and tracking devices for each organization. For example, the sensor network manager 363 may include a registration module which receives and manages information related to the WSDs and tracking devices that is assigned to the devices at the time of manufacture. The sensor network manager 363 may also include a claiming module which is used when devices are claimed by organizations (e.g., the claiming may be performed at least in part by populating the tracking devices database 364, the wireless sensing device database 366, and the organization database 370 with appropriate information when the WSDs and tracking devices are associated to an organization).

In an embodiment, the sensor network manager 363 provides a user interface module 372 used to create a Web interface to allow administrators to create and log into an account associated with an organization to which a set of tracking devices belong (e.g., tracking device 120). A set of WSDs can also belong to the organization and the sensor network manager 363 may provide the user interface module 372 for managing and configuring the asset tracking devices and the WSDs. The computer readable storage medium 362 further includes the location data database 374 (including location data received from the tracking device(s)), an optional sensor measurements database 368 (including data indicative of sensor measurements received from the WSDs or the tracking devices), tracking devices database 364 (including information regarding the tracking devices), a wireless sensing device database 366 (including information regarding the WSDs), and an organizations database 370 (including information regarding the organizations to which the WSDs and/or tracking devices belong).

While one embodiment does not implement virtualization, alternative embodiments may use different forms of virtualization—represented by a virtualization layer 375. In these embodiments, the management server 140 and the hardware that executes it form a virtual management server which is a software instance of the modules stored on the computer readable storage medium 362. The server device 380 can be used to perform the operations of a management server as described with reference to FIGS. 1A-2G.

While some components of the tracking device or the management server are illustrated as code stored on the computer readable storage medium, in other embodiments the modules may be implemented in hardware or in a combination of hardware and software. While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a tracking device mounted on an asset, the method comprising:
receiving, from a management server, configuration parameters including first configuration parameters that include a first data transmission rate, second configuration parameters that include a second data transmission rate, and a first plurality of motion definition parameters that define a first type of movement for the asset to be considered as being mobile or stationary;
automatically entering into an active mode of the tracking device during a first interval of time, wherein the active mode includes:
responsive to determining, based on first motion sensor measurements and the first plurality of motion definition parameters, that the asset is stationary, transmitting, at the first data transmission rate, first location data of the asset to the management server, and
responsive to determining, based on second motion sensor measurements and the first plurality of motion definition parameters, that the asset is mobile, transmitting, at the second data transmission rate, second location data of the asset to the management server; and
receiving, from the management server, a second plurality of motion definition parameters that define a second type of movement for the asset to be considered as being mobile or stationary, wherein the second type of movement is different from the first type of movement; and
when operating in the active mode of the tracking device during a second interval of time that is different from the first interval of time, performing the following
responsive to determining, based on the second plurality of motion definition parameters, that the asset is stationary, transmitting, at the first data transmission rate, third location data of the asset to the management server, and
responsive to determining, based on the second plurality of motion definition parameters, that the asset is mobile, transmitting, at the second data transmission rate, fourth location data of the asset to the management server.

2. The method of claim 1, wherein the first configuration parameters include the first data transmission rate, a first start time at which the tracking device is to start transmission of location according to the first data transmission rate, whereby the first configuration parameters cause the battery life of the tracking device to be extended.

3. The method of claim 1, wherein the transmitting, at the second data transmission rate, second location data of the asset to the management server includes:
transmitting, to the management server, a first location reading upon automatically detecting, based on the first plurality of motion definition parameters, that the tracking device has started moving;
transmitting, to the management server, one or more additional location readings based on the second data transmission rate while the tracking device is determined to be moving; and
transmitting, to the management server, a second location reading upon automatically determining, based on the first plurality of motion definition parameters, that the tracking device has stopped moving.

4. The method of claim 1, wherein the second data transmission rate is greater than the first data transmission rate causing the management server to obtain more frequent location data when the asset is mobile than when the asset is stationary.

5. The method of claim 1, wherein the automatically entering, into the active mode of the tracking device is performed based on first pressure measurements; and the method further comprises:
automatically entering, based on second pressure measurements, into a passive mode of the tracking device in which no data is transmitted.

6. The method of claim 1, wherein the receiving the configuration parameters includes receiving, through a connectionless communication protocol, one or more messages of serialized structured data including the configuration parameters.

7. The method of claim 1, wherein the transmitting, based on the second configuration parameters, location data of the asset to the management server at the second data transmission rate, includes:
 transmitting, to the management server at a first time, third location data determined based on a first positioning technology; and
 transmitting, to the management server at a second time that is later than the first time, fourth location data determined based on a second positioning technology.

8. The method of claim 1, wherein the transmitting, at the second data transmission rate, second location data of the asset to the management server, includes:
 transmitting, to the management server at a third time and via a first cellular network from a plurality of cellular networks, fifth location data of the asset, wherein the first cellular network is available at the third time; and
 transmitting, to the management server at a fourth time that is later than the third time and via a second cellular network from the plurality of cellular networks, sixth location data of the asset.

9. The method of claim 1, further comprising:
 receiving updated configuration parameters, wherein the updated configuration parameters includes a smart mode of operation; and
 transmitting, based on the smart mode of operation, new data location of the asset when the new data location is different from a previously transmitted data location.

10. A tracking device to be mounted on an asset, the tracking device comprising:
 a non-transitory computer readable storage medium to store instructions; and
 a processor coupled with the non-transitory computer readable storage medium to process the stored instructions to:
  receive, from a management server, configuration parameters including first configuration parameters that include a first data transmission rate, second configuration parameters that include a second data transmission rate, and a first plurality of motion definition parameters that define a first type of movement for the asset to be considered as being mobile or stationary,
  automatically enter into an active mode of the tracking device during a first interval of time, wherein the active mode includes:
   responsive to determining, based on first motion sensor measurements and the first plurality of motion definition parameters, that the asset is stationary, transmit, at the first data transmission rate, first location data of the asset to the management server, and
   responsive to determining, based on second motion sensor measurements and the first plurality of motion definition parameters, that the asset is mobile, transmit, at the second data transmission rate, second location data of the asset to the management server; and
  receive, from the management server, a second plurality of motion definition parameters that define a second type of movement for the asset to be considered as being mobile or stationary, wherein the second type of movement is different from the first type of movement; and
  when operating in the active mode of the tracking device during a second interval of time that is different from the first interval of time, perform the following
   responsive to determining, based on the second plurality of motion definition parameters, that the asset is stationary, transmit, at the first data transmission rate, third location data of the asset to the management server, and
   responsive to determining, based on the second plurality of motion definition parameters, that the asset is mobile, transmit, at the second data transmission rate, fourth location data of the asset to the management server.

11. The tracking device of claim 10, wherein the first configuration parameters include the first data transmission rate, a first start time at which the tracking device is to start transmission of location according to the first data transmission rate, whereby the first configuration parameters cause the battery life of the tracking device to be extended.

12. The tracking device of claim 10, wherein to transmit, at the second data transmission rate, second location data of the asset to the management server, includes to:
 transmit, to the management server, a first location reading upon automatically detecting, based on the first plurality of motion definition parameters, that the tracking device has started moving;
 transmit, to the management server, one or more additional location readings based on the second data transmission rate while the tracking device is determined to be moving; and
 transmit, to the management server, a second location reading upon automatically determining, based on the first plurality of motion definition parameters, that the tracking device has stopped moving.

13. The tracking device of claim 10, wherein the second data transmission rate is greater than the first data transmission rate causing the management server to obtain more frequent location data when the asset is mobile than when the asset is stationary.

14. The tracking device of claim 10, wherein to automatically enter, into the active mode of the tracking device is performed based on first pressure measurements; and the processor is further to:
 automatically enter, based on second pressure measurements, into a passive mode of the tracking device in which no data is transmitted.

15. The tracking device of claim 10, wherein to receive the configuration parameters includes to receive, through a connectionless communication protocol, one or more messages of serialized structured data including the configuration parameters.

16. The tracking device of claim 10, wherein to transmit, based on the second configuration parameters, location data of the asset to the management server at the second data transmission rate, includes to:
 transmit, to the management server at a first time, third location data determined based on a first positioning technology; and
 transmit, to the management server at a second time that is later than the first time, fourth location data determined based on a second positioning technology.

17. The tracking device of claim 10, wherein to transmit, at the second data transmission rate, second location data of the asset to the management server, includes to:
- transmit, to the management server at a third time and via a first cellular network from a plurality of cellular networks, fifth location data of the asset, wherein the first cellular network is available at the third time; and
- transmit, to the management server at a fourth time that is later than the third time and via a second cellular network from the plurality of cellular networks, sixth location data of the asset.

18. The tracking device of claim 10, wherein the processor is further to:
- receive updated configuration parameters, wherein the updated configuration parameters includes a smart mode of operation; and
- transmit, based on the smart mode of operation, new data location of the asset when the new data location is different from a previously transmitted data location.

19. A non-transitory computer readable storage medium that provide instructions, which when executed by a processor of a tracking device to be mounted on an asset, cause said processor to perform operations comprising:
- receiving, from a management server, configuration parameters including first configuration parameters that include a first data transmission rate, second configuration parameters that include a second data transmission rate, and a first plurality of motion definition parameters that define a first type of movement for the asset to be considered as being mobile or stationary;
- automatically entering into an active mode of the tracking device during a first interval of time, wherein the active mode includes:
  - responsive to determining, based on first motion sensor measurements and the first plurality of motion definition parameters, that the asset is stationary, transmitting, at the first data transmission rate, first location data of the asset to the management server, and
  - responsive to determining, based on second motion sensor measurements and the first plurality of motion definition parameters, that the asset is mobile, transmitting, at the second data transmission rate, second location data of the asset to the management server; and
- receiving, from the management server, a second plurality of motion definition parameters that define a second type of movement for the asset to be considered as being mobile or stationary, wherein the second type of movement is different from the first type of movement; and
- when operating in the active mode of the tracking device during a second interval of time that is different from the first interval of time, performing the following
  - responsive to determining, based on the second plurality of motion definition parameters, that the asset is stationary, transmitting, at the first data transmission rate, third location data of the asset to the management server, and
  - responsive to determining, based on the second plurality of motion definition parameters, that the asset is mobile, transmitting, at the second data transmission rate, fourth location data of the asset to the management server.

20. The non-transitory computer readable storage medium of claim 19, wherein the first configuration parameters include the first data transmission rate, a first start time at which the tracking device is to start transmission of location according to the first data transmission rate, whereby the first configuration parameters cause the battery life of the tracking device to be extended.

21. The non-transitory computer readable storage medium of claim 19, wherein the transmitting, at the second data transmission rate, second location data of the asset to the management server, includes:
- transmitting, to the management server, a first location reading upon automatically detecting, based on the first plurality of motion definition parameters, that the tracking device has started moving;
- transmitting, to the management server, one or more additional location readings based on the second data transmission rate while the tracking device is determined to be moving; and
- transmitting, to the management server, a second location reading upon automatically determining, based on the first plurality of motion definition parameters, that the tracking device has stopped moving.

22. The non-transitory computer readable storage medium of claim 19, wherein the second data transmission rate is higher than the first data transmission rate causing the management server to obtain more frequent location data when the asset is mobile than when the asset is stationary.

23. The non-transitory computer readable storage medium of claim 19, wherein the automatically entering, into the active mode of the tracking device is performed based on first pressure measurements; and the operations further comprise:
- automatically entering, based on second pressure measurements, into a passive mode of the tracking device in which no data is transmitted.

24. The non-transitory computer readable storage medium of claim 19, wherein the receiving the configuration parameters includes receiving, through a connectionless communication protocol, one or more messages of serialized structured data including the configuration parameters.

25. The non-transitory computer readable storage medium of claim 19, wherein the transmitting, based on the second configuration parameters, location data of the asset to the management server at the second data transmission rate, includes:
- transmitting, to the management server at a first time, third location data determined based on a first positioning technology; and
- transmitting, to the management server at a second time that is later than the first time, fourth location data determined based on a second positioning technology.

26. The non-transitory computer readable storage medium of claim 19, wherein the transmitting, at the second data transmission rate, second location data of the asset to the management server, includes:
- transmitting, to the management server at a third time and via a first cellular network from a plurality of cellular networks, fifth location data of the asset, wherein the first cellular network is available at the third time; and
- transmitting, to the management server at a fourth time that is later than the third time and via a second cellular network from the plurality of cellular networks, sixth location data of the asset.

27. The non-transitory computer readable storage medium of claim 19, wherein the operations further comprise:
- receiving updated configuration parameters, wherein the updated configuration parameters includes a smart mode of operation; and transmitting, based on the smart mode of operation, new data location of the asset when the new data location is different from a previously transmitted data location.

28. The method of claim 1, wherein at least one of the first plurality of motion definition parameters includes a minimum amount of time during which the tracking device is to move for the asset to be determined as being in motion, a minimum distance that needs to be traveled by the tracking device for the asset to be determined as being in motion, or a motion pattern that includes motion in a first direction for an interval of time and motion in a second direction for another interval of time.

29. The tracking device of claim 10, wherein at least one of the first plurality of motion definition parameters includes a minimum amount of time during which the tracking device is to move for the asset to be determined as being in motion, a minimum distance that needs to be traveled by the tracking device for the asset to be determined as being in motion, or a motion pattern that includes motion in a first direction for an interval of time and motion in a second direction for another interval of time.

30. The non-transitory computer readable storage medium of claim 19, wherein at least one of the first plurality of motion definition parameters includes a minimum amount of time during which the tracking device is to move for the asset to be determined as being in motion, a minimum distance that needs to be traveled by the tracking device for the asset to be determined as being in motion, or a motion pattern that includes motion in a first direction for an interval of time and motion in a second direction for another interval of time.

\* \* \* \* \*